US012670867B2

(12) United States Patent
Seo et al.

(10) Patent No.: US 12,670,867 B2
(45) Date of Patent: Jun. 30, 2026

(54) GATE DRIVING CIRCUIT AND DISPLAY DEVICE INCLUDING THE SAME

(71) Applicant: LG Display Co., Ltd., Seoul (KR)

(72) Inventors: Dae Young Seo, Paju-si (KR); Byung Hyun Lee, Paju-si (KR); Min Seok Kim, Paju-si (KR); Tae Yong Kim, Paju-si (KR); Su Min Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/958,672

(22) Filed: Nov. 25, 2024

(65) Prior Publication Data

US 2025/0218395 A1 Jul. 3, 2025

(30) Foreign Application Priority Data

Dec. 29, 2023 (KR) ........................ 10-2023-0197411

(51) Int. Cl.
*G09G 3/3266* (2016.01)
*G09G 3/32* (2016.01)
*G09G 3/3275* (2016.01)

(52) U.S. Cl.
CPC ............. *G09G 3/3266* (2013.01); *G09G 3/32* (2013.01); *G09G 3/3275* (2013.01); *G09G 2310/0267* (2013.01); *G09G 2310/0275* (2013.01); *G09G 2310/0291* (2013.01); *G09G 2310/08* (2013.01)

(58) Field of Classification Search
CPC ...... G09G 3/3266; G09G 3/32; G09G 3/3275; G09G 2310/0267; G09G 2310/0275; G09G 2310/0291; G09G 2310/08
See application file for complete search history.

(56) References Cited

U.S. PATENT DOCUMENTS

| | | | | |
|---|---|---|---|---|
| 8,018,423 | B2 * | 9/2011 | Tsai | G11C 19/28 377/64 |
| 8,384,461 | B2 * | 2/2013 | Yonemaru | G11C 19/28 327/241 |
| 8,952,945 | B2 * | 2/2015 | Huang | G09G 3/3674 345/204 |
| 9,030,399 | B2 * | 5/2015 | Tseng | G09G 3/20 345/100 |
| 9,330,782 | B2 * | 5/2016 | Yamamoto | G11C 19/28 |
| 9,483,993 | B2 * | 11/2016 | Dai | G11C 19/28 |
| 9,672,783 | B2 * | 6/2017 | Ochiai | G09G 3/3648 |
| 9,693,684 | B2 * | 7/2017 | Lopez | G06F 21/31 |
| 10,089,915 | B2 * | 10/2018 | Kim | G09G 3/2092 |
| 10,546,520 | B2 * | 1/2020 | Noh | G09G 3/3674 |
| 10,789,868 | B2 * | 9/2020 | Tian | G09G 3/20 |
| 10,923,008 | B2 * | 2/2021 | Feng | G09G 3/3677 |
| 11,037,502 | B2 * | 6/2021 | Yuan | G09G 3/3225 |
| 11,250,768 | B2 * | 2/2022 | Park | G09G 3/3266 |

(Continued)

FOREIGN PATENT DOCUMENTS

| | | |
|---|---|---|
| KR | 10-2022-0094957 A | 7/2022 |
| KR | 10-2022-0095652 A | 7/2022 |

*Primary Examiner* — Michael J Jansen, II
(74) *Attorney, Agent, or Firm* — Fenwick & West LLP

(57) ABSTRACT

A gate driving circuit and a display device including the same are disclosed. More particularly, a gate driving circuit capable of improving an output deviation of a first output buffer circuit and an output deviation of a last output buffer circuit among a plurality of output buffer circuits included in one stage circuit, respectively and a display device including the same are disclosed.

21 Claims, 20 Drawing Sheets

(56) References Cited

U.S. PATENT DOCUMENTS

| | | | | | |
|---|---|---|---|---|---|
| 11,482,179 | B2 * | 10/2022 | Kim | G09G 3/3258 | |
| 11,551,619 | B2 * | 1/2023 | Seo | G09G 3/3291 | |
| 11,783,780 | B2 * | 10/2023 | Jo | G09G 3/3266 | 345/214 |
| 2008/0266275 | A1 * | 10/2008 | Tsai | G09G 3/3677 | 345/204 |
| 2012/0076256 | A1 * | 3/2012 | Yonemaru | G11C 19/28 | 377/79 |
| 2013/0100007 | A1 * | 4/2013 | Yamamoto | G09G 3/36 | 377/64 |
| 2013/0222357 | A1 * | 8/2013 | Tseng | G09G 3/20 | 345/212 |
| 2014/0035889 | A1 * | 2/2014 | Huang | G09G 3/3674 | 345/204 |
| 2014/0226131 | A1 * | 8/2014 | Lopez | G06F 21/31 | 351/210 |
| 2015/0091887 | A1 * | 4/2015 | Ochiai | G09G 3/3648 | 345/212 |
| 2016/0247442 | A1 * | 8/2016 | Dai | G11C 19/28 | |
| 2016/0379546 | A1 * | 12/2016 | Kim | G09G 3/2092 | 345/213 |
| 2019/0043405 | A1 * | 2/2019 | Noh | G09G 3/3674 | |
| 2019/0206294 | A1 * | 7/2019 | Tian | G11C 19/28 | |
| 2020/0020266 | A1 * | 1/2020 | Feng | G11C 19/28 | |
| 2020/0394960 | A1 * | 12/2020 | Yuan | G09G 3/3266 | |
| 2021/0201770 | A1 * | 7/2021 | Park | G09G 3/32 | |
| 2022/0208109 | A1 * | 6/2022 | Seo | G09G 3/3233 | |
| 2022/0208112 | A1 * | 6/2022 | Kim | G09G 3/3266 | |
| 2022/0208114 | A1 * | 6/2022 | Jo | G09G 3/3266 | |

* cited by examiner

| | As-is | | To-Be[Buffer] | | To-Be[Cap] | |
|---|---|---|---|---|---|---|
| | time_r[μs] | time_f[μs] | time_r[μs] | time_f[μs] | time_r[μs] | time_f[μs] |
| 1 | **2.30** | 0.72 | **1.69** | 0.79 | **1.75** | 0.78 |
| 2 | 1.15 | 0.72 | 1.67 | 0.79 | 1.61 | 0.77 |
| 3 | 1.06 | 0.77 | 1.58 | 0.76 | 1.51 | 0.76 |
| 4 | 1.05 | **0.89** | 1.56 | 0.83 | 1.48 | **0.83** |
| Average | 1.09 | 0.74 | 1.60 | 0.78 | 1.53 | 0.77 |
| Deviation | **+1.21** | **+0.15** | **+0.09** | **+0.05** | **+0.22** | **+0.06** |
| Improvement rate | - | - | 92.86% | 67.39% | 82.14% | 60.87% |

GATE DRIVING CIRCUIT AND DISPLAY DEVICE INCLUDING THE SAME

CROSS-REFERENCE TO RELATED APPLICATION

This application claims priority to and the benefit of Republic of Korea Patent Application No. 10-2023-0197411, filed on Dec. 29, 2023, which is hereby incorporated by reference in its entirety.

BACKGROUND

Field

The present embodiment relates to a gate driving circuit and a display device including the same.

Discussion of Related Art

A driving circuit of a flat panel display (FPD) includes a data driving circuit that supplies a data signal to data lines, a gate driving circuit that supplies a gate signal (or scan signal) to gate lines (or scan lines), and the like. The gate driving circuit may be directly formed on the same substrate together with circuit elements of a pixel array constituting a screen.

The circuit elements of the pixel array constitute a pixel circuit formed in each of the pixels defined in a matrix form by the data lines and gate lines of the pixel array. Each of the circuit elements of the pixel array and the gate driving circuit includes a plurality of transistors. Here, the gate driving circuit may be directly formed on a substrate of the display panel together with the circuit elements of the pixel array. Such a gate driving circuit may be referred to as a gate in panel (GIP) circuit.

In order to reduce the size of the gate driving circuit, a method of outputting gate signals to a plurality of pixel lines through one output terminal is being considered.

SUMMARY

The present disclosure provides a gate driving circuit capable of improving an output deviation of a first output buffer circuit and an output deviation of a last output buffer circuit among a plurality of output buffer circuits included in one stage circuit, respectively, and a display including the same.

The problems to be solved in this embodiment are not limited to the problems mentioned above, and other problems not mentioned here will be clearly understood by those skilled in the art from the following description.

This embodiment provides a gate driving circuit, the gate driving circuit includes: at least one stage circuit configured to supply gate signals to a plurality of gate lines and including a first node, wherein the stage circuits include N output buffer circuits (where N is a natural number greater than or equal to 2) configured to sequentially output a pulse of the gate signal in response to a pulse of corresponding clock signal while the first node is in a pre-charged state; and an output improvement circuit configured to improve an output deviation of a first output buffer circuit that outputs a first gate signal among the N output buffer circuits and improve an output deviation of an Nth output buffer circuit that outputs the last gate signal among the N output buffer circuits.

The output improvement circuit may include: a first output improvement circuit configured to reinforce the voltage of the first node in response to a previous clock signal whose phase is earlier than that of a clock signal input to the first output buffer circuit; and a second output improvement circuit configured to attenuate the voltage of the first node in response to a next clock signal whose phase is later than that of the clock signal input to the Nth output buffer circuit.

The first output improvement circuit may reinforce the voltage of the first node by a rising edge of the previous clock signal before the first output buffer circuit outputs the gate signal, and the second output improvement circuit may attenuate the voltage of the first node by a falling edge of the next clock signal after the Nth output buffer circuit outputs the gate signal.

The first output improvement circuit may include a first transistor including a gate terminal to which the voltage of the first node is input, a first terminal to which the previous clock signal is input, and a second terminal from which the previous clock signal is output, and a first capacitor connected between the gate terminal and the second terminal to reinforce the voltage of the first node.

The second output improvement circuit may include a second transistor including a gate terminal to which the voltage of the first node is applied, a first terminal to which the next clock signal is input, and a second terminal from which the next clock signal is output, and a second capacitor connected between the gate terminal and the second terminal to attenuate the voltage of the first node.

The first output improvement circuit may include a first capacitor having one end connected to the first node and the other end connected to a clock line to which the previous clock signal is input.

The second output improvement circuit may include a second capacitor having one end connected to the first node and the other end connected to a clock line to which the next clock signal is input.

When the length of the high voltage level of the clock signal corresponds to M horizontal periods (where M is a natural number greater than or equal to 2), the stage circuit may include M−1 first output improvement circuits and M−1 second output improvement circuits.

In another aspect, this embodiment provides a gate driving circuit, the gate driving circuit includes: a first stage circuit, a second stage circuit, and a third stage circuit configured to supply gate signals to a plurality of gate lines and including a first node, wherein the second stage circuit includes a first output buffer circuit to an Nth output buffer circuit (where N is a natural number greater than or equal to 2) configured to sequentially output pulses of gate signals in response to pulses of a corresponding clock signal while the first node is in the pre-charged state; and an output improvement circuit configured to improve an output deviation of the first output buffer circuit and an output deviation of the Nth output buffer circuit.

The output improvement circuit may include: a first output improvement circuit configured to reinforce the voltage of the first node in response to a previous stage gate signal, which is a gate signal output from a last output buffer circuit of the first stage circuit; and a second output improvement circuit configured to attenuate the voltage of the first node in response to a next stage gate signal, which is a gate signal output from a first output buffer circuit of the third stage circuit.

The first output improvement circuit may reinforce the voltage of the first node by a rising edge of the previous stage gate signal before the first output buffer circuit outputs a gate signal, and the second output improvement circuit may attenuate the voltage of the first node by a falling edge of the next stage gate signal after the Nth output buffer circuit outputs a gate signal.

The first output improvement circuit may include a first transistor including a gate terminal to which the voltage of the first node is applied, a first terminal to which the previous stage gate signal is input, and a second terminal from which the previous stage gate signal is output, and a first capacitor connected between the gate terminal and the second terminal to reinforce the voltage of the first node.

The second output improvement circuit may include a second transistor including a gate terminal to which the voltage of the first node is applied, a first terminal to which the next stage gate signal is input, and a second terminal from which the next stage gate signal is output, and a second capacitor connected between the gate terminal and the second terminal to attenuate the voltage of the first node.

The first output improvement circuit may include a first capacitor having one end connected to the first node and the other end connected to a signal line to which the previous stage gate signal is input.

The second output improvement circuit may include a second capacitor having one end connected to the first node and the other end connected to a signal line to which the next stage gate signal is input.

In another aspect, this embodiment provides a display device, the display device includes: a display panel that includes a plurality of pixel circuits, wherein the pixel circuits are connected to corresponding data lines and gate lines; a data driving circuit configured to output a data signal applied to the data line; a gate driving circuit configured to receive a clock signal and supplies a generated gate signal to the gate line; and a timing controller configured to control driving of the data driving circuit and the gate driving circuit, wherein the gate driving circuit is configured to supply gate signals to a plurality of gate lines and includes a first stage circuit, a second stage circuit, and a third stage circuit including a first node, the second stage circuit includes a first to Nth output buffer circuits configured to sequentially output pulses of a gate signal using pulses of a corresponding clock signal while the first node is in a pre-charged state; and an output improvement circuit configured to improve an output deviation of the first output buffer circuit and an output deviation of the Nth output buffer circuit.

The output improvement circuit may include: a first output improvement circuit configured to reinforce the voltage of the first node before a gate signal is output from the first output buffer circuit; and a second output improvement circuit configured to attenuate the voltage of the first node after the gate signal is output from the Nth output buffer circuit.

The first output improvement circuit may reinforce the voltage of the first node in response to a pulse of a previous clock signal whose phase is earlier than that of a clock signal input to the first output buffer circuit, and the second output improvement circuit may attenuate the voltage of the first node in response to a pulse of a next clock signal whose phase is later than a clock signal input to the Nth output buffer circuit.

The first output improvement circuit may reinforce the voltage of the first node by a rising edge of the previous clock signal, and the second output improvement circuit attenuates the voltage of the first node by a falling edge of the next clock signal.

The first output improvement circuit may reinforce the voltage of the first node in response to a pulse of a previous stage gate signal, which is a gate signal output from a last output buffer circuit of the first stage circuit, and the second output improvement circuit may attenuate the voltage of the first node in response to a pulse of a next stage gate signal, which is a gate signal output from a first output buffer circuit of the third stage circuit.

The first output improvement circuit may reinforce the voltage of the first node by a rising edge of the previous stage gate signal, and the second output improvement circuit may attenuate the voltage of the first node by a falling edge of the next stage gate signal.

As described above, according to this embodiment, an output improvement circuit that improves the output deviation of the first output buffer circuit and the last output buffer circuit of the stage circuit may be added to the stage circuit to improve the output deviation of the first output buffer circuit and the last output buffer circuit.

Various useful advantages and effects of the embodiments are not limited to the above-described contents and will be more easily understood from descriptions of the specific embodiments.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
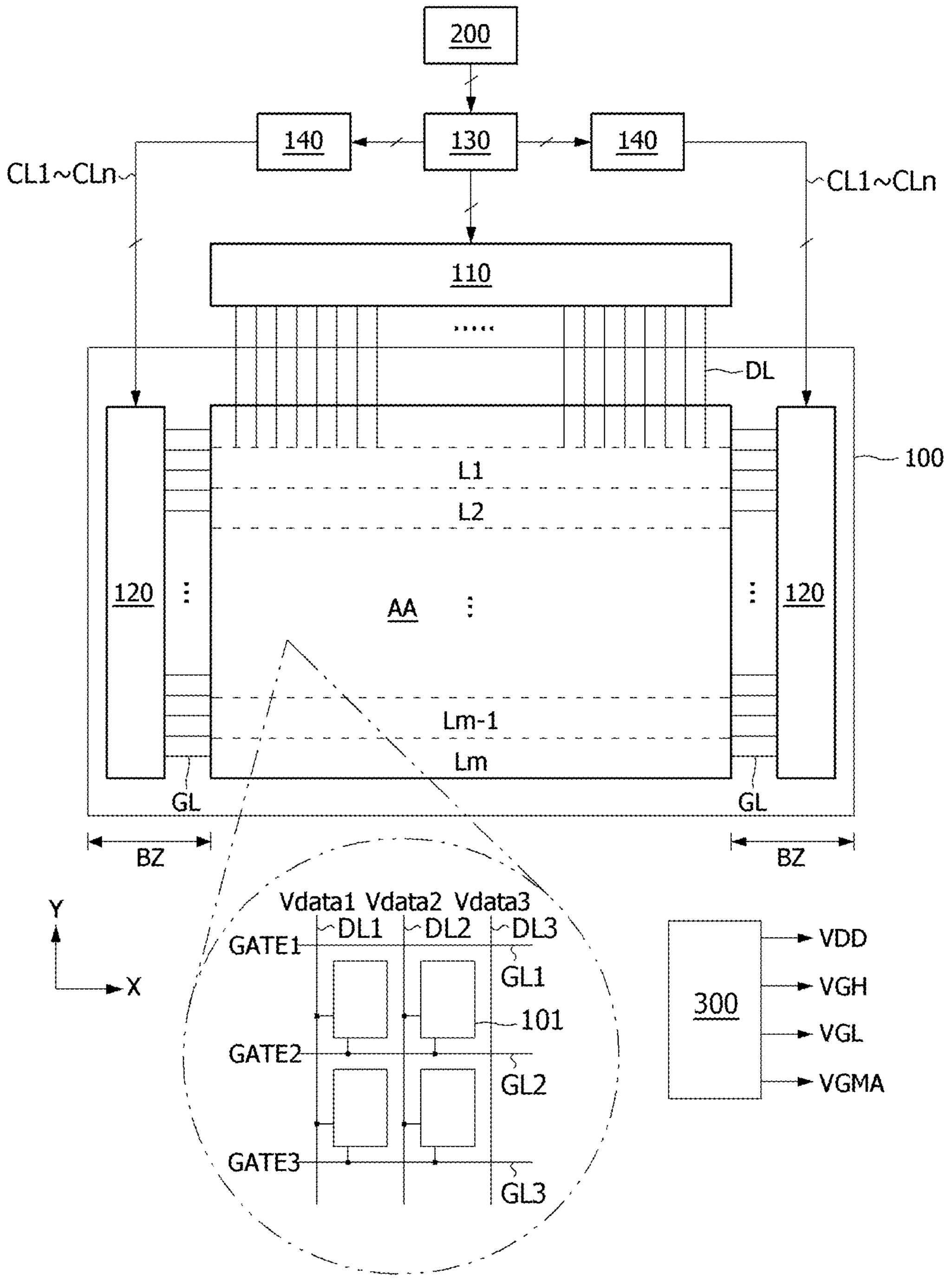
FIG. 1 is a block diagram illustrating a display according to one embodiment.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple", "crossing or intersecting", and the like, one or more other parts may be interposed therebetween unless the term "immediately" or "directly" is used in the expression.

The terms "first," "second," and the like may be used to distinguish components from each other, but the functions or structures of the components are not limited by ordinal numbers or component names in front of the components. Because the claims are written around essential components, the ordinal numbers preceding the component names in the claims may not match the ordinal numbers preceding the component names in the embodiments.

The following embodiments can be partially or entirely bonded to or combined with each other and can be linked and operated in technically various ways. The embodiments can be carried out independently of or in association with each other.

In the display device of the present disclosure, the display panel driving circuit, a pixel array, a level shifter, etc. may include transistors. The transistors may be implemented by an oxide thin film transistor (TFT) including an oxide semiconductor, a low temperature polysilicon (LTPS) TFT including LTPS, or the like.

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons may flow from the source to the drain. In the N-channel transistor, the direction of current flows from the drain to the source. In the case of a P-channel transistor, since the carrier is a hole, the source voltage is higher than the drain voltage so that the hole may flow from the source to the drain. In the P-channel transistor, current flows from the source to the drain because the hole flows from the source to the drain. It should be noted that the source and drain of the transistor are not fixed. For example, the source and drain may be changed according to the applied voltage. Therefore, the invention is not limited due to the source and drain of the transistor. In the following description, the source and drain of the transistor will be referred to as a first terminal and a second terminal.

The gate signal swings between a gate-on voltage and a gate-off voltage. The gate-off voltage may be interpreted as a first voltage, and the gate-on voltage may be interpreted as a second voltage. The transistor is turned on in response to the gate-on voltage, while the transistor is turned off in response to the gate-off voltage. In the case of an N-channel transistor, the gate-on voltage may be a gate high voltage (VGH), and the gate-off voltage may be a gate low voltage (VGL). In the case of a P-channel transistor, the gate-on voltage may be the gate low voltage (VGL), and the gate-off voltage may be the gate high voltage (VGH).

The present disclosure is applicable to any flat panel display device that requires an integrated circuit and a power circuit for driving pixels, such as a liquid crystal display (LCD), an organic light emitting display (OLED), and the like. Hereinafter, various embodiments of the present disclosure will be described in detail with reference to the accompanying drawings.

FIG. 1 is a block diagram illustrating a display device according to one embodiment.

Referring to FIG. 1, a display device according to one embodiment includes a display panel 100 and a display panel driving circuit.

The display panel 100 includes a pixel array AA that displays pixel data of an input image. The pixel data of the input image is displayed in the pixels of the pixel array AA. The pixel array AA includes data lines DL, a plurality of gate lines GL intersecting the data lines DL, and pixels arranged in a matrix form. Here, in addition to the matrix form, the arrangement form of pixels may be formed in various ways, such as a shape of sharing pixels emitting the same color, a stripe shape, a diamond shape, and the like.

When the resolution of the pixel array AA is n (where n is a natural number)×m (where m is a natural number), the pixel array AA includes n pixel columns and m pixel lines L1 to Lm intersecting the pixel columns. The pixel line includes pixels arranged along a first direction X. The pixel column includes pixels arranged along a second direction Y. In general, one horizontal period 1H may be a time period obtained by dividing one frame period by m, which is the number of pixel lines L1 to Lm. In one horizontal period 1H, pixel data may be written to pixels of one pixel line.

Each of the pixels includes two or more sub-pixels 101 for color implementation. For example, each of the pixels may be divided into a red sub-pixel, a green sub-pixel, and a blue sub-pixel. Each of the pixels may further include a white sub-pixel. Each of the sub-pixels 101 includes a pixel circuit. The pixel circuit is connected to the data line DL and the gate line GL. In one embodiment, when the display device is an organic light emitting display device, the pixel circuit is shown in FIG. 2.

Figure 2:
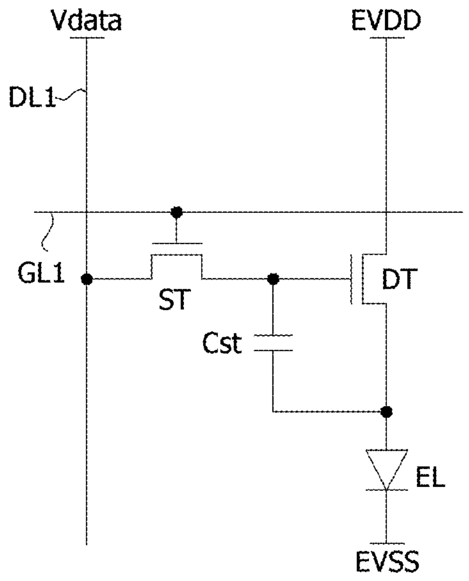
FIG. 2 is a diagram illustrating an example of a pixel circuit according to one embodiment.

Referring to FIG. 2, the pixel circuit may include a light-emitting element EL, a driving element DT that supplies current to the light-emitting element EL, a switch element ST that supplies a data signal Vdata to a gate terminal of the driving element DT in response to a gate signal GATE1, and a capacitor Cst that is connected between the gate terminal and a source terminal of the driving element DT. The driving element DT and the switch element ST may be implemented as N-channel transistors.

A pixel driving voltage EVDD may be applied to a drain terminal of the driving element DT. The driving element DT drives the light-emitting element EL by supplying a current to the light-emitting element EL according to a gate-source voltage Vgs. The switching element ST is turned on in response to a gate-on voltage VGH of a gate signal GATE1. The light-emitting element EL is turned on and emits light when a forward voltage between an anode terminal and a cathode terminal is greater than or equal to a threshold voltage. A pixel base voltage EVSS lower than the pixel driving voltage EVDD is applied to the cathode terminal of the light-emitting element EL.

The capacitor Cst is connected between the gate terminal and the source terminal of the driving element DT to maintain the gate-source voltage Vgs of the driving element DT.

Meanwhile, the light-emitting element EL may be implemented as an inorganic light-emitting diode (LED) such as a micro-LED or an organic light-emitting diode such as an organic light emitting diode (OLED) including an organic compound layer formed between the anode and the cathode, but is not limited thereto. Here, the organic compound layer may include a hole injection layer (HIL), a hole transport layer (HTL), an emission layer (EML), an electron transport layer (ETL), and an electron injection layer (EIL), but is not limited thereto. When a voltage is applied to an anode terminal and a cathode terminal of the OLED, holes that have passed through the hole transport layer (HTL) and electrons that have passed through the electron transport layer (ETL) move to the emission layer (EML) to form excitons, and visible light is emitted from the emission layer (EML). An OLED used as the light-emitting element (EL) may have a tandem structure in which a plurality of emission layers are stacked. The OLED having the tandem structure may improve luminance and lifetime of a pixel.

Meanwhile, the display panel 100 may further include touch sensors. Here, the touch sensors may be disposed on the screen of the display panel 100 in an on-cell type or an add-on type.

Furthermore, touch sensors may be implemented in an in-cell type embedded in the pixel array AA.

In one embodiment, the display panel driving circuit writes data of an input image to pixels of the display panel 100 under the control of a timing controller 130. The display panel driving circuit may include a data driving circuit 110, a gate driving circuit 120, a timing controller 130 for controlling operation timings of the data driving circuit 110 and the gate driving circuit 120, and a level shifter 140 connected between the timing controller 130 and the gate driving circuit 120. Here, the display panel driving circuit may further include a power supply 300. Here, the level shifter 140 may be included in the timing controller 130.

The data driving circuit 110 outputs data signals Vdata1 to Vdata3 by converting pixel data of an input image received as a digital signal from the timing controller 130 for each frame into an analog gamma compensation voltage. As shown in a circle in FIG. 1, a first to third data signals Vdata1 to Vdata3 output from the data driving circuit 110 are supplied to corresponding first to third data lines DLI to DL3. The data driving circuit 110 outputs the data signals Vdata1 to Vdata3 using a digital to analog converter (hereinafter, referred to as "DAC") that converts the digital signal into the analog gamma compensation voltage.

The data driving circuit 110 may be integrated in a source driver integrated circuit (SDIC). The source driver IC may be connected to a bonding pad of the display panel 100 using a tape automated bonding (TAB) method or a chip on glass (COG) method. Also, the source driver IC may be implemented using a chip on film (COF) method.

When the display panel 100 further includes touch sensors, the source driver IC may include a touch sensor driving circuit for driving the touch sensors.

The gate driving circuit 120 may be formed in a bezel area BZ in which no image is displayed in the display panel 100, or at least a part thereof may be disposed in the pixel array AA. The gate driving circuit 120 receives a clock signal received from the level shifter 140 and outputs a gate signal GATE. The gate signal GATE is supplied to the gate lines GL.

As shown in the circle of FIG. 1, the gate signals GATE1 to GATE3 applied to first to third gate lines GL1 to GL3 turn on the switch element of the sub-pixels 101 to select pixels charged with voltages of the data signals Vdata1 to Vdata3. The switch element of the sub-pixel 101 may be turned on in response to the gate-on voltage VGH of the corresponding gate signals GATE1 to GATE3, and may be turned off according to a gate-off voltage VGL. The gate signals GATE1 to GATE3 swing between the gate-on voltage VGH and the gate-off voltage VGL.

The gate driving circuit 120 shifts the gate signal by using a shift register or an edge trigger. Here, the shift register and the edge trigger include a plurality of stage circuits that are connected dependently on each other.

The timing controller 130 may control the operation timings of the data driving circuit 110 and the gate driving circuit 120 with a frame frequency of an input frame frequency×i (where i is a natural number) Hz by multiplying the input frame frequency by a factor of i. The input frame frequency may be 60 Hz in the National Television Standards Committee (NTSC) system and 50 Hz in the phase-alternating line (PAL) system.

The timing controller 130 receives pixel data of an input image and a timing signal synchronized therewith from a host system 200. The pixel data of the input image received by the timing controller 130 is a digital signal. The timing controller 130 transmits the pixel data to the data driving circuit 110. Here, the timing signal may include a vertical synchronization signal Vsync, a horizontal synchronization signal Hsync, a clock signal DCLK, a data enable signal DE, and the like. Since a vertical period and a horizontal period may be known by a method of counting the data enable signal DE, the vertical synchronization signal Vsync and the horizontal synchronization signal Hsync may be omitted. The data enable signal DE has a period of one horizontal period 1H.

The timing controller 130 may generate a data timing control signal for controlling the data driving circuit 110 and a gate timing control signal for controlling the gate driving circuit 120 based on a timing signal received from the host system 200. The gate timing control signal may be generated as a clock of a digital signal voltage level.

The host system 200 may be any one of a television (TV), a set-top box, a navigation system, a personal computer (PC), a home theater, a mobile system, and a wearable system. In a mobile device and a wearable device, the data driving circuit 110, the timing controller 130, the level shifter 140, and the like may be integrated in a single drive IC (not shown). In a mobile system, the host system 200 may be implemented as an application processor (AP). The host system 200 may transmit pixel data of the input image to the drive IC through a mobile industry processor interface (MIPI). The host system 200 may be connected to the drive IC through a flexible printed circuit board (FPCB).

The clock signal output from the level shifter 140 swings between the gate-on voltage VGH and the gate-off voltage VGL, and is supplied to the gate driving circuit 120 through the clock lines CLI to CLn. The clock signal output from the level shifter 140 may be applied to at least one of the gate driving circuit 120, the data driving circuit 110, and the touch sensor driving circuit.

The power supply 300 generates a voltage required to drive the pixel array and the display panel driving circuit of the display panel 100 using the DC-DC converter. The DC-DC converter may include a charge pump, a regulator, a buck converter, a boost converter, a buck-boost converter, and the like. The power supply 300 may generate a DC voltage such as a gamma reference voltage VGMA, a gate-on voltage VGH, a gate-off voltage VGL, a common voltage of the pixels, and the like by adjusting a DC input voltage from the host system 200. The gamma reference voltage VGMA is supplied to the data driving circuit 110. The gamma reference voltage VGMA is divided for each gray level through a voltage dividing circuit of the data driving circuit 110, and is then supplied to the DAC of the data driving circuit 110. The power supply 300 may generate a constant voltage, for example, the pixel driving voltage EVDD and the pixel base voltage EVSS, which are commonly applied to the pixels.

As described above, the display device including the display panel 100 and the display panel driving circuit may be a display device to which a narrow bezel that minimizes the bezel area BZ is applied.

In addition, the gate driving circuit 120 may output a plurality of gate signals in one stage circuit to minimize or at least reduce the size of the circuit. In other words, one stage circuit may include a plurality of output buffer circuits, and each of the plurality of output buffer circuits may output a gate signal.

Hereinafter, a configuration for outputting a plurality of gate signals from one stage circuit will be described.

Figure 3:
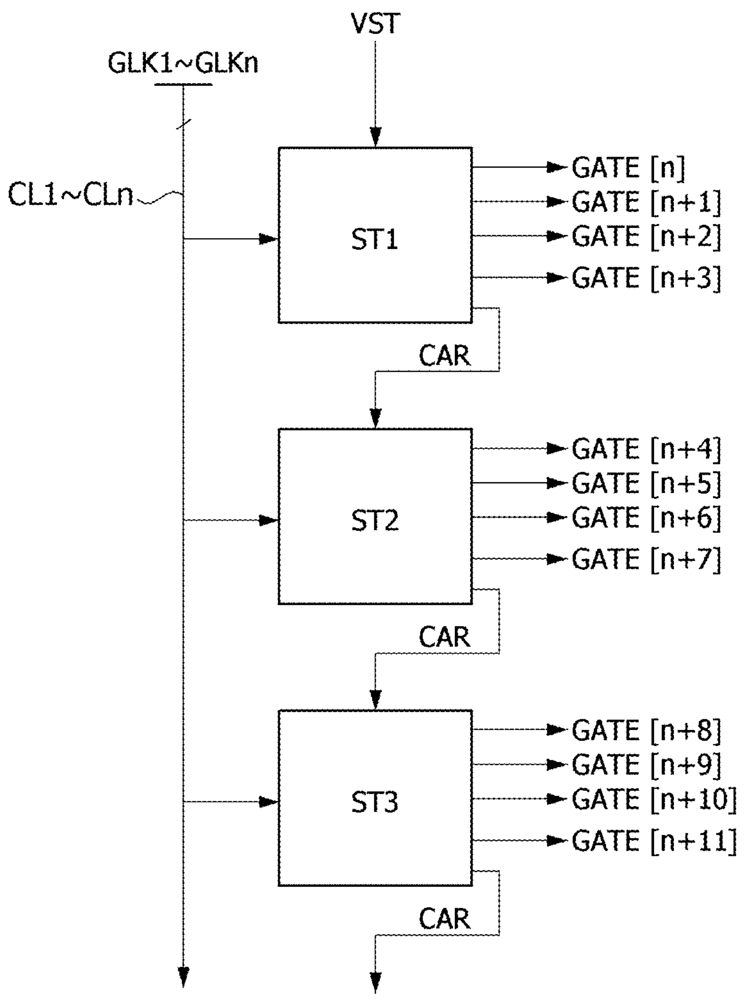
FIG. 3 is a diagram schematically illustrating a shift register of an existing gate driving circuit according to one embodiment.

FIG. 3 is a diagram schematically illustrating a shift register of a gate driving circuit.

Referring to FIG. 3, the shift register of the gate driving circuit 120 may include stage circuits ST1, ST2, ST3, etc. that are dependently connected to each other.

The shift register may receive a start signal VST or a carry signal CAR, and may receive clock signals CLK1 to CLKn from the level shifter 140. Here, the gate start signal VST may be input to the first stage circuit ST1. And the carry signal CAR may be output from a previous stage circuit.

The stage circuits ST1 to ST3 may sequentially receive a plurality of clock signals through the clock lines CL1 to CLn. In other words, the stage circuits ST1 to ST3 may receive a plurality of clock signals whose phases are shifted by a predetermined period (or horizontal period).

The stage circuits ST1 to ST3 may sequentially output a plurality of gate signals using a plurality of sequentially input clock signals. Here, the stage circuits ST1 to ST3 may output the carry signal CAR and supply the same to the next stage circuit.

In FIG. 3, it is shown that one stage circuit outputs four gate signals. However, the present disclosure is not limited thereto, and two or three gate signals may be output from one stage circuit, and five or more gate signals may be output.

Figure 4:
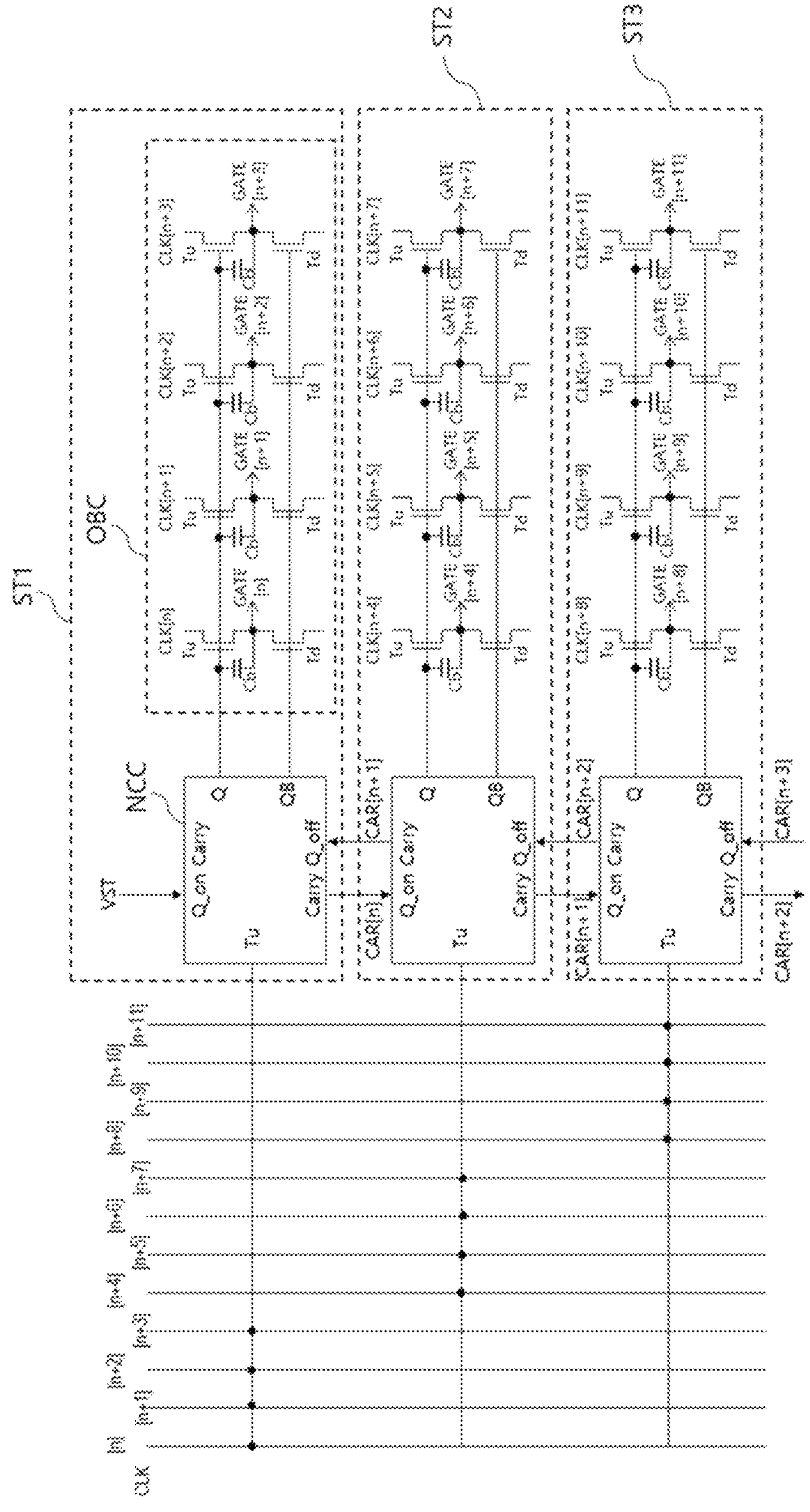
FIG. 4 is a diagram illustrating a configuration of the stage circuit according to a first embodiment.

FIG. 4 is a diagram illustrating a configuration of a stage circuit according to a first embodiment.

Figure 5:
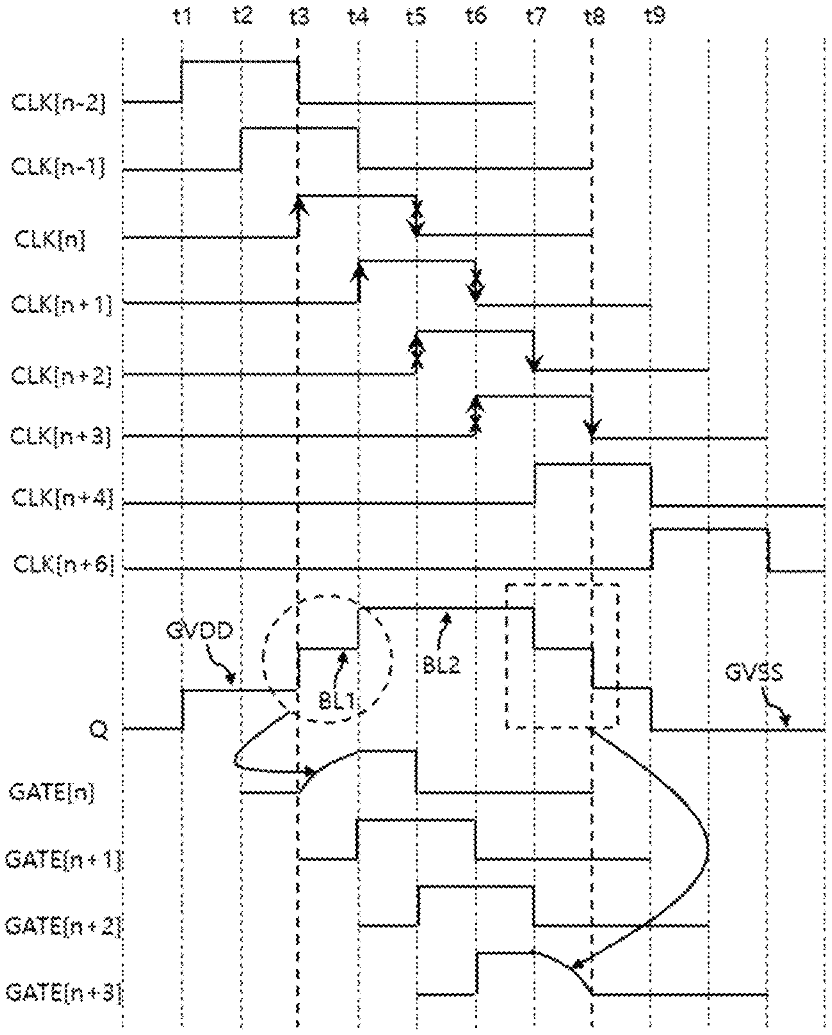
FIG. 5 is a diagram for explaining an output deviation occurring in the stage circuit according to the first embodiment.

And FIG. 5 is a diagram for explaining an output deviation occurring in a stage circuit according to a first embodiment.

Although FIG. 4 shows a pull-up transistor Tu and a pull-down transistor Td as N-channel transistors, the present embodiment is not limited thereto. In other words, the pull-up transistor Tu and the pull-down transistor Td may also be P-channel transistors.

FIG. 5 also shows waveforms of a clock signal, a gate signal, and a Q node voltage when the pull-up transistor Tu and the pull-down transistor Td are N-channel transistors, but the present embodiment is not limited thereto. In other words, waveforms of the clock signal, the gate signal, and the Q node voltage may be when the pull-up transistor Tu and the pull-down transistor Td are P-channel transistors.

Referring to FIG. 4, the stage circuits ST1, ST2 or ST3 according to the first embodiment may include a node control circuit NCC and a plurality of output buffer circuits OBC. A carry signal output circuit (not shown) for outputting a carry signal may be further included.

Here, the output buffer circuit may include a pull-up transistor Tu, a pull-down transistor Td, and a boosting capacitor Cb.

The node control circuit NCC controls voltages of the Q node and the QB node.

The voltage of the Q node may be input to the gate terminal of the pull-up transistor Tu included in each of the plurality of output buffer circuits OBC, and the clock signal may be input to the first terminal. A gate signal having a high voltage level may be output from the second terminal.

In other words, the plurality of output buffer circuits OBC may output a gate signal using a corresponding clock signal while the Q node is in the pre-charged state. Here, the plurality of output buffer circuits OBC may sequentially output gate signals from a first output buffer circuit to a last output buffer circuit.

In FIG. 4, when four clock signals CLK[n] to [n+3] or CLK[n+4] to [n+7] or CLK[n+8] to [n+11] are input to Tu of the node control circuit NCC, it may be interpreted that four clock signals are sequentially input to the plurality of output buffer circuits OBC.

For example, in the first stage circuit ST1 of FIG. 4, four clock signals CLK[n] to [n+3] are input to Tu of the node control circuit NCC, and it may be interpreted that clock signals CLK[n], CLK[n+1], CLK[n+2], and CLK[n+3] are sequentially input to a first output buffer circuit, a second output buffer circuit, a third output buffer circuit, and a fourth output buffer circuit. Here, n is a natural number greater than or equal to 1.

Meanwhile, the voltage of the QB node may be input to the gate terminal of the pull-down transistor Td included in each of the plurality of output buffer circuits OBC, and a gate signal at a low voltage level may be output from the first terminal. And low voltage power may be input to the second terminal.

The boosting capacitor Cb included in each of the plurality of output buffer circuits OBC may be connected between the gate terminal and the second terminal of the pull-up transistor Tu to boost the voltage of the Q node. Here, when the voltage of the Q node is boosted, the gate signal may be quickly output.

With the above configuration, the plurality of gate signals may be sequentially output from one stage circuit.

Here, the plurality of gate signals sequentially output may have overlapping portions as shown in FIG. 5. For example, when the turn-on duration (high voltage level length) of the gate signal is 2 horizontal periods 2H, the two gate signals may overlap by 1 horizontal period 1H.

In other words, the stage circuit may perform overlapping driving. Here, the overlapping driving may mean that when the stage circuit sequentially outputs the plurality of gate signals, the stage circuit outputs them in such a way that a part of the turn-on duration of two or more gate signals overlaps. When the stage circuit performs overlapping driving, the voltage charging rate of the sub-pixel may be improved.

On the other hand, in the overlapping driving of the stage circuit according to the first embodiment, since the voltage of the Q node is reinforced in the first output buffer circuit, an output deviation occurs in the gate signals output from the first output buffer circuit.

And since the voltage of the Q node is attenuated in the last output buffer circuit, the output deviation also occurs in the gate signals output from the last output buffer circuit.

Specifically, the node control circuit NCC pre-charges the voltage of the Q node to the first high voltage level GVDD in the interval t1 to t3 of FIG. 5.

Thereafter, the first output buffer circuit reinforces the voltage of the Q node at time point t3. Here, the first output buffer circuit reinforces the voltage Q of the Q node by a rising edge of the nth clock signal CLK[n].

In other words, the first output buffer circuit reinforces the voltage of the Q node from the first high voltage level GVDD to the first boosting voltage level BL1 at time point t3.

The second output buffer circuit reinforces the voltage of the Q node again at time point t4. Here, the second output buffer circuit reinforces the voltage of the Q node by the rising edge of the (n+1)th clock signal CLK[n+1].

In other words, the second output buffer circuit reinforces the voltage of the Q node from the first boosting voltage level BL1 to the second boosting voltage level BL2 at time point t4.

At time point t5, when the (n+2)th clock signal CLK[n+2] is input to the third output buffer circuit, the rising edge of the (n+2)th clock signal CLK[n+2] and the falling edge of the nth clock signal CLK[n] overlap to offset the voltage change of the Q node.

In other words, during an interval from t4 to t5, the voltage of the Q node is maintained at the second boosting voltage level BL2.

At time point t6, at which the (n+3)th clock signal CLK[n+3] is input to the fourth output buffer circuit, the rising edge of the (n+3)th clock signal CLK[n+3] and the falling edge of the (n+1)th clock signal CLK[n+1] overlap to offset the voltage change of the Q node.

In other words, in the interval from t5 to t6, the voltage of the Q node is maintained at the second boosting voltage level BL2.

At time point t7, the voltage of the Q node is attenuated from the second boosting voltage level BL2 to the first boosting voltage level BL1 by the falling edge of the (n+2)th clock signal CLK[n+2] inputted to the third output buffer circuit.

At time point t8, the voltage of the Q node is attenuated from the first boosting voltage level BL1 to the first high voltage level GVDD by the falling edge of the (n+3)th clock signal CLK[n+3] inputted to the fourth output buffer circuit.

Then, at time point t9, the node control circuit NCC resets the voltage of the Q node to the first low voltage level GVSS.

Here, reinforcement may be interpreted as boosting or step-up, and attenuation may be interpreted as step-down.

In general, when the voltage change of the Q node occurs, the output deviation occurs in the gate signals.

In FIG. 5, since the voltage change (dotted circle) of the Q node occurs in the interval t3 to t4 in which the first output buffer circuit outputs the gate signal GATE [n], the rising edge (interval t3 to t4) of the gate signal GATE (n) becomes longer than the rising edge of other gate signals.

In addition, since in the interval t7 to t8, when the fourth output buffer circuit, which is the last output buffer circuit, outputs the gate signal GATE [n+3], the voltage change (dotted square mark) of the Q node occurs, the falling edge of the gate signal GATE [n+3] (interval t7 to t8) is longer than the falling edge of other gate signals.

As described above, when the output deviation in which the rising edge of the gate signal is lengthened and the output deviation in which the falling edge of the gate signal is lengthened occurs, a malfunction of the transistor operated by the gate signal in the pixel circuit (for example, the switch element ST in FIG. 2, etc.) may occur, which may result in a degradation of the image quality of the display device.

In the second embodiment, the output deviation of the first output buffer circuit and the output deviation of the last output buffer circuit may be improved through the following configuration.

Figure 6:
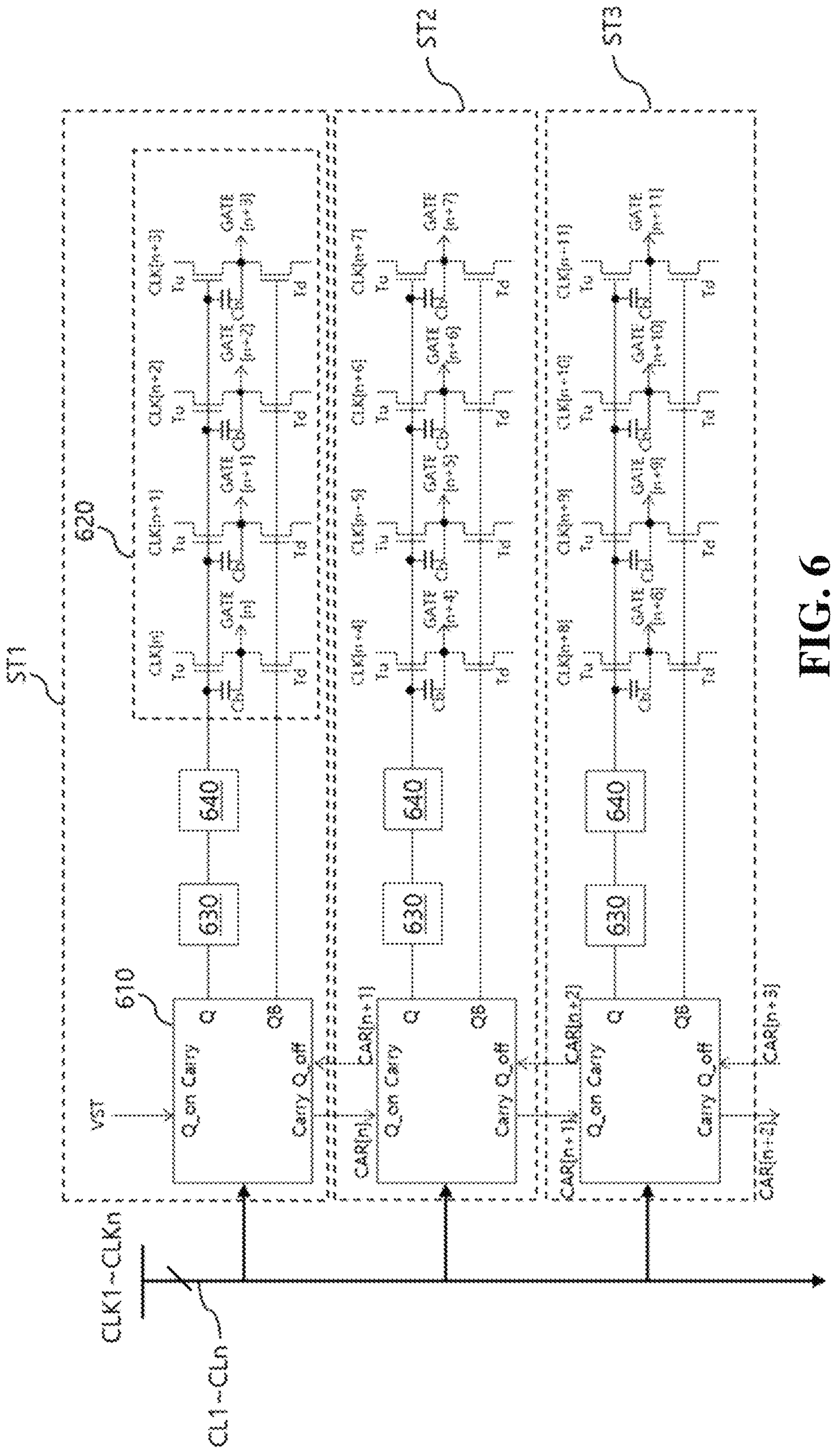
FIG. 6 is a diagram illustrating a configuration of the stage circuit according to a second embodiment.

FIG. 6 is a diagram illustrating a configuration of a stage circuit according to a second embodiment.

Referring to FIG. 6, the gate driving circuit 120 may include one or more stage circuits (for example, ST1, ST2, ST3, etc.).

And each stage circuit includes a node control circuit 610, N output buffer circuits (where N is a natural number greater than or equal to 2), that is, a first output buffer circuit to Nth output buffer circuit 620. And each stage circuit further includes an output improvement circuit. Here, the output improvement circuit includes a first output improvement circuit 630 and a second output improvement circuit 640.

In other words, in the second embodiment, the gate driving circuit 120, that is, the stage circuit, may add an output improvement circuit to the node control circuit 610 and the first to Nth output buffer circuits 620 to improve the output deviation of the first output buffer circuit and the output deviation of the last output buffer circuit.

Here, the first output buffer circuit to the Nth output buffer circuit are sequentially disposed. Although FIG. 6 illustrates that the first output improvement circuit 630 and the second output improvement circuit 640 are disposed ahead of the first output buffer circuit, the present embodiment is not limited thereto. In other words, the first output improvement circuit 630 and the second output improvement circuit 640 may be disposed between the first output buffer circuit 620 and the Nth output buffer circuit 620, or may be disposed behind the Nth output buffer circuit.

Meanwhile, in one embodiment, each stage circuit may further include a carry signal output circuit (not shown) for outputting a carry signal.

The node control circuit 610 controls charging and discharging (resets) of the Q node, which is the first node, and charging and discharging of the QB node, which is the second node.

In other words, the node control circuit 610 controls voltages of the first node and the second node.

Figure 7:
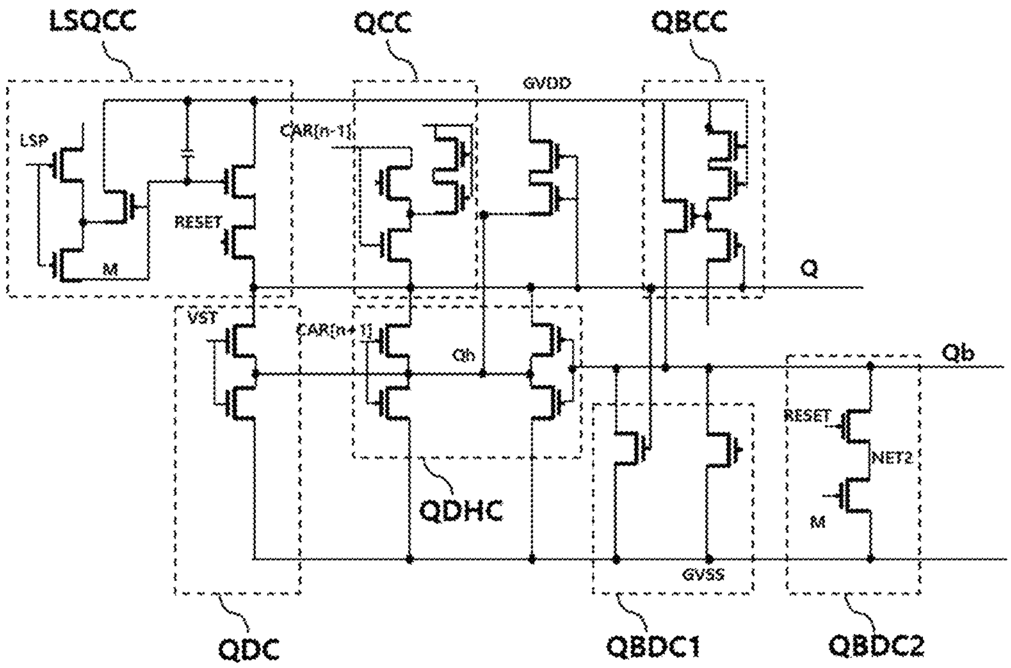
FIG. 7 is a diagram illustrating a configuration of a node control circuit in the stage circuit according to the second embodiment.

The node control circuit 610 may include a line selection and Q charging circuit LSQCC, a Q discharging circuit QDC, a Q charging circuit QCC, a Q discharging and holding circuit QDHC, a QB charging circuit QBCC, a first QB discharging circuit QBDC1, and a second QB discharging circuit QBDC2, as shown in FIG. 7.

Here, when the display device has a sensing function of the pixel circuit, the line selection and Q charging circuit LSQCC, the Q discharging circuit QDC, and the second QB discharging circuit QBDC2 may be included in the node control circuit NCC.

The line selection and Q charging circuit LSQCC may be a circuit that selects any one pixel line as a line on which sensing driving is performed and charges the first node when sensing is driven. During the sensing driving, the line selection and Q charging circuit LSQCC may charge the first node to a high voltage level (for example, GVDD).

In FIG. 7, LSP may mean a line selection signal, and RESET may mean a reset signal.

The Q discharging circuit QDC may be a circuit that discharges the first node during the sensing driving. During the sensing driving, the Q discharging circuit QDC may discharge (reset) the first node to a low voltage level (for example, GVSS).

The Q charging circuit QCC may be a circuit for charging the first node when display driving. When the display driving, the Q charging circuit QCC may charge the first node to a high voltage level (for example, GVDD). Here, the Q charging circuit QCC may charge the first node by the previous carry signal CAR[n−1] supplied from the previous stage circuit.

The Q discharging and holding circuit QDHC may be a circuit that discharges the first node during the display driving and stably maintains the voltage state of the first node. During the display driving, the Q discharging and holding circuit QDHC may discharge (reset) the first node to a low voltage level (for example, GVSS). Here, the Q discharging and holding circuit QDHC may discharge the first node by the next carry signal CAR[n+1] supplied from the next stage circuit.

The first QB discharging circuit QBDC1 may be a circuit that discharges the second node when the display driving. When the display driving, the first QB discharging circuit QBDC1 may discharge (reset) the second node to a low voltage level (for example, GVSS).

The second QB discharging circuit QBDC2 may be a circuit for discharging the first node during the sensing driving. During the sensing driving, the second QB discharging circuit QBDC2 may discharge (reset) the second node to a low voltage level (for example, GVSS).

The first to Nth output buffer circuits 620, that is, N output buffer circuits, sequentially output gate signals in response to pulses of corresponding clock signals while the first node is in the pre-charged state.

Here, the voltage of the first node may be input to the gate terminal of the pull-up transistor Tu included in each of the first to Nth output buffer circuits 620, and a corresponding clock signal may be input to the first terminal. And a gate signal having a high voltage level may be output from the second terminal. The boosting capacitor Cb included in each of the first to Nth output buffer circuits 620 may be connected between the gate terminal and the second terminal of the pull-up transistor Tu to boost the voltage of the first node.

The first to Nth output buffer circuits 620 may sequentially output gate signals from the first output buffer circuit (the first output buffer circuit) to the last buffer circuit (the Nth output buffer circuit).

Meanwhile, the output improvement circuit improves the output deviation of the first output buffer circuit that outputs the first gate signal, and improves the output deviation of the Nth output buffer circuit that outputs the last gate signal. The output improvement circuit may include a first output improvement circuit 630 and a second output improvement circuit 640.

The first output improvement circuit 630 reinforces the voltage of the first node in response to a pulse of a previous clock signal, which is a clock signal whose phase is earlier than that of a clock signal input to the first output buffer circuit. Here, the first output improvement circuit 630 may reinforce the voltage of the first node by a rising edge of the previous clock signal before outputting the gate signal from the first output buffer circuit.

Figure 8:
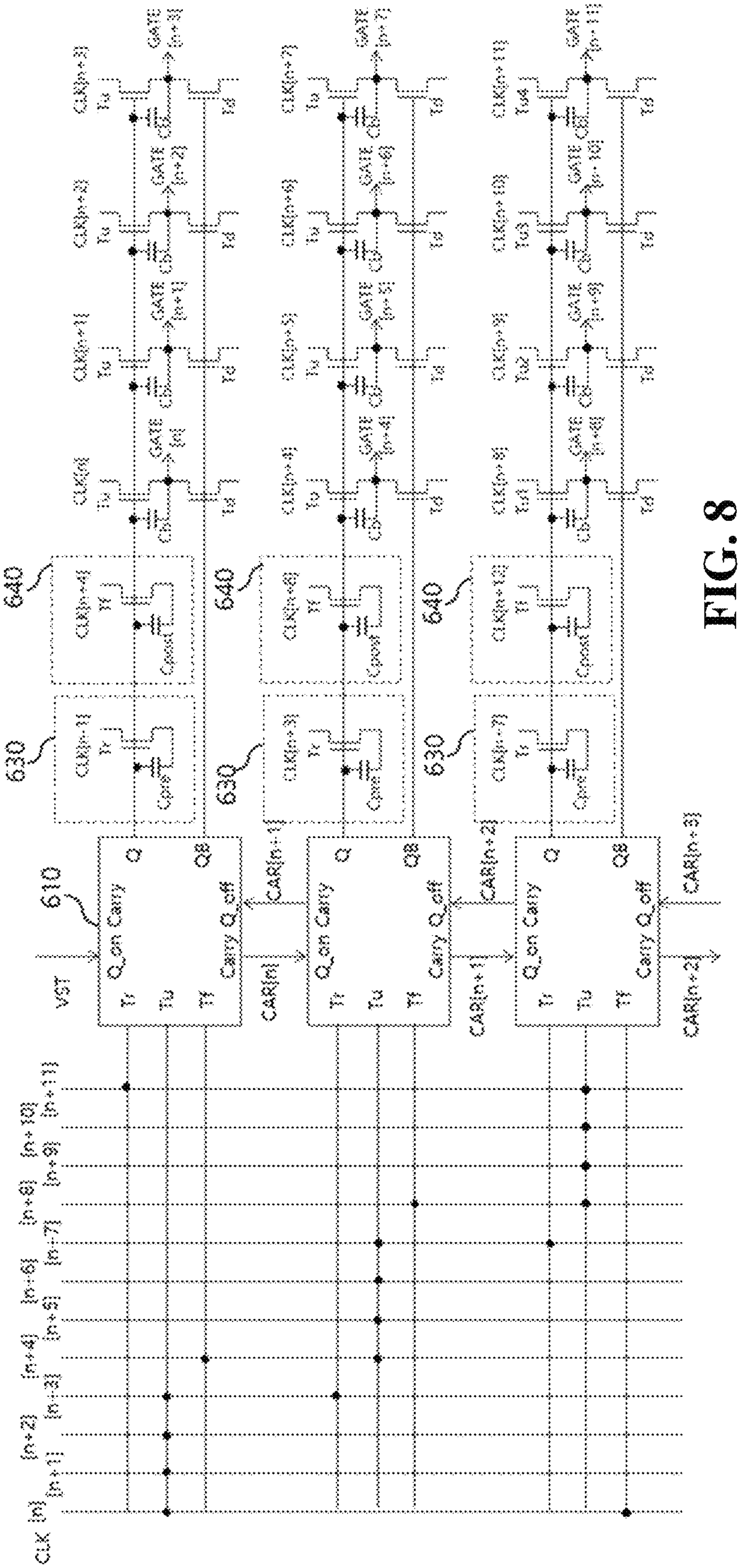
FIGS. 8 to 11 are diagrams for describing a configuration of an output improvement circuit in the stage circuit according to the second embodiment.

The first output improvement circuit 630 that uses the previous clock signal may include a first transistor Tr and a first capacitor C_pre, as shown in FIG. 8. In other words, the first output improvement circuit 630 may be implemented as a buffer circuit. Here, the first transistor Tr may include a gate terminal to which a voltage of the first node is input, a first terminal to which a previous clock signal (for example, CLK[n−1]) is input, and a second terminal to which the previous clock signal is output. And the first capacitor C_pre may be connected between the gate terminal and the second terminal of the first transistor Tr to reinforce the voltage of the first node.

Figure 9:
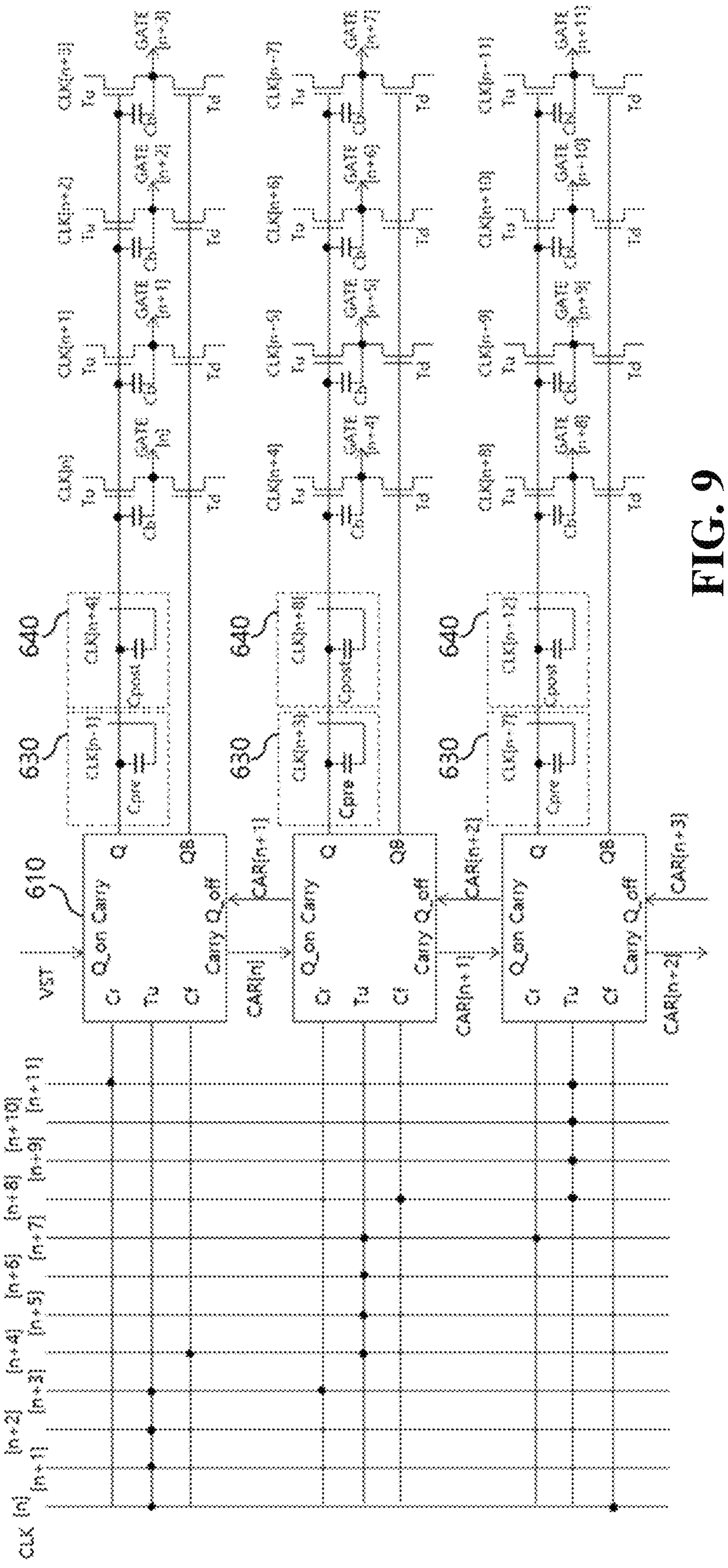

In one embodiment, the first output improvement circuit 630 may include a first capacitor Cpre having one end connected to the first node and the other end connected to the clock line, as shown in FIG. 9. In other words, the first output improvement circuit 630 may be implemented as a capacitor circuit. Here, the previous clock signal (for example, CLK[n−1]) is input to the clock line.

The first output improvement circuit 630 as described above only reinforces the voltage of the first node, but does not output a gate signal like an output buffer circuit.

In other words, the output buffer circuit is connected to the gate line and outputs a gate signal to the gate line, but the first output improvement circuit 630 only reinforces the voltage of the first node and is not connected to the gate line.

When the four clock signals CLK[n] to [n+3] or CLK[n+4] to [n+7] or CLK[n+8] to [n+11] are input to the Tu of the node control circuit 610 in FIG. 8 and FIG. 9, it may be interpreted that four clock signals are sequentially input to the first output buffer circuit 620 to the Nth output buffer circuit 620.

In addition, when the previous clock signal CLK[n+11], CLK[n+3] or CLK[n+7] is inputted to Tr of the node control circuit 610, it may be interpreted that the previous clock signal is inputted to the first output improvement circuit 630. Here, n is a natural number greater than or equal to 1.

For example, when four clock signals CLK[n] to [n+3] are input to the Tu of the node control circuit 610 in the first stage circuit ST1, it may be interpreted that clock signals CLK[n], CLK[n+1], CLK[n+2], and CLK[n+3] are sequentially input to the first output buffer circuit, the second output buffer circuit, the third output buffer circuit, and the fourth output buffer circuit.

In addition, when the clock signal CLK[n+11] is inputted to Tr of the node control circuit 610 in the first stage circuit ST1, it may be interpreted that the clock signal CLK[n−1] is inputted to the first output improvement circuit 630. Here, when the clock signal CLK[n] is a first clock signal, a previous clock signal CLK[n−1] of the first clock signal may be CLK[n+11], which is a last clock signal.

Meanwhile, the first output improvement circuit 630 may reinforce the voltage of the first node by using the previous stage gate signal, which is a gate signal output from the last output buffer circuit of the previous stage circuit.

For example, the first output improvement circuit 630 of the second stage circuit ST2 may reinforce the voltage of the first node by using the previous stage gate signal GATE[n+3] output from the last output buffer circuit of the first stage circuit ST1.

Here, the first output improvement circuit 630 may reinforce the voltage of the first node by the rising edge of the previous stage gate signal.

Figure 10:
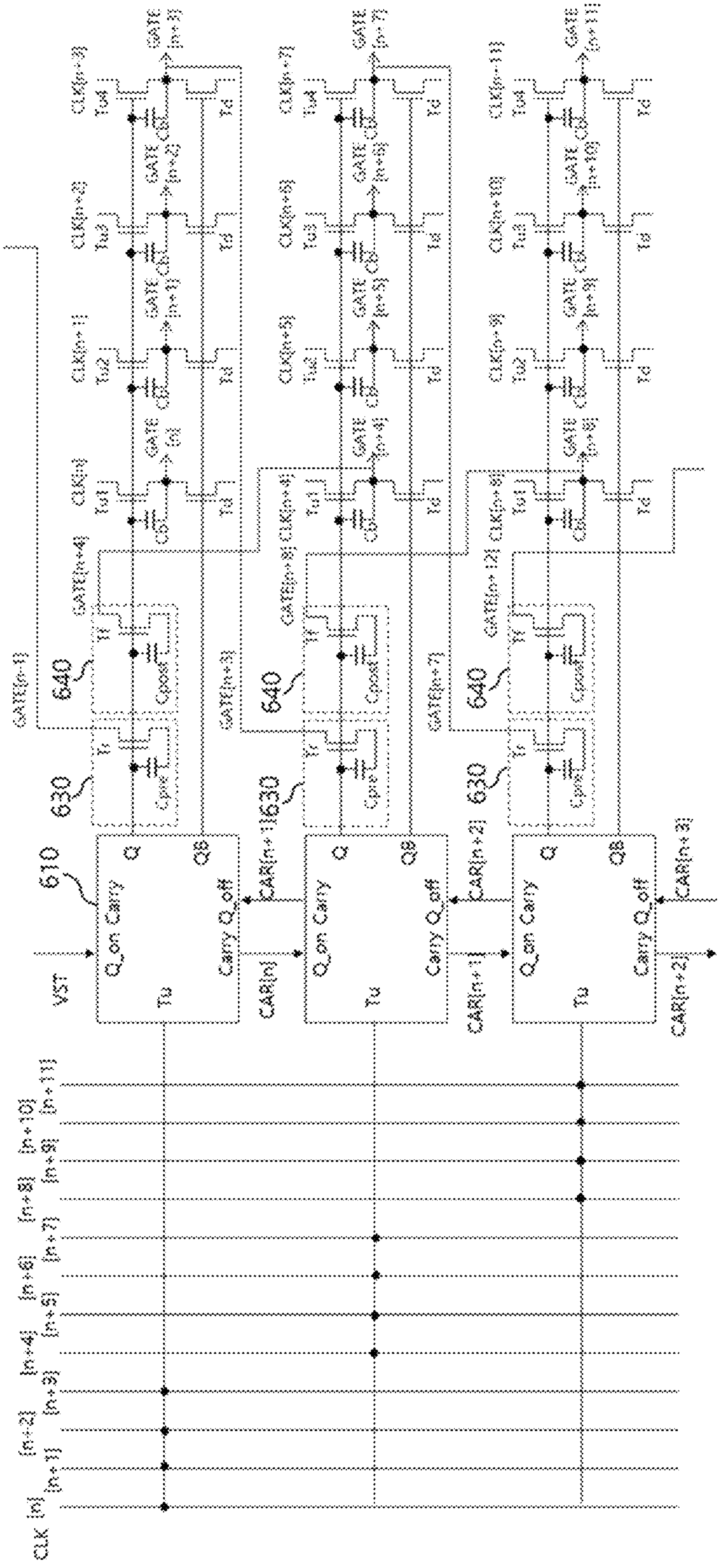

The first output improvement circuit 630 using the previous stage gate signal may include a first transistor Tr and a first capacitor C_pre, as shown in FIG. 10. Here, the first transistor Tr may include a gate terminal to which a voltage of the first node is input, a first terminal to which a previous stage gate signal (for example, GATE[n−1]) is input, and a second terminal from which the previous stage gate signal is output. And the first capacitor C_pre may be connected between the gate terminal and the second terminal of the first transistor Tr to reinforce the voltage of the first node.

Figure 11:
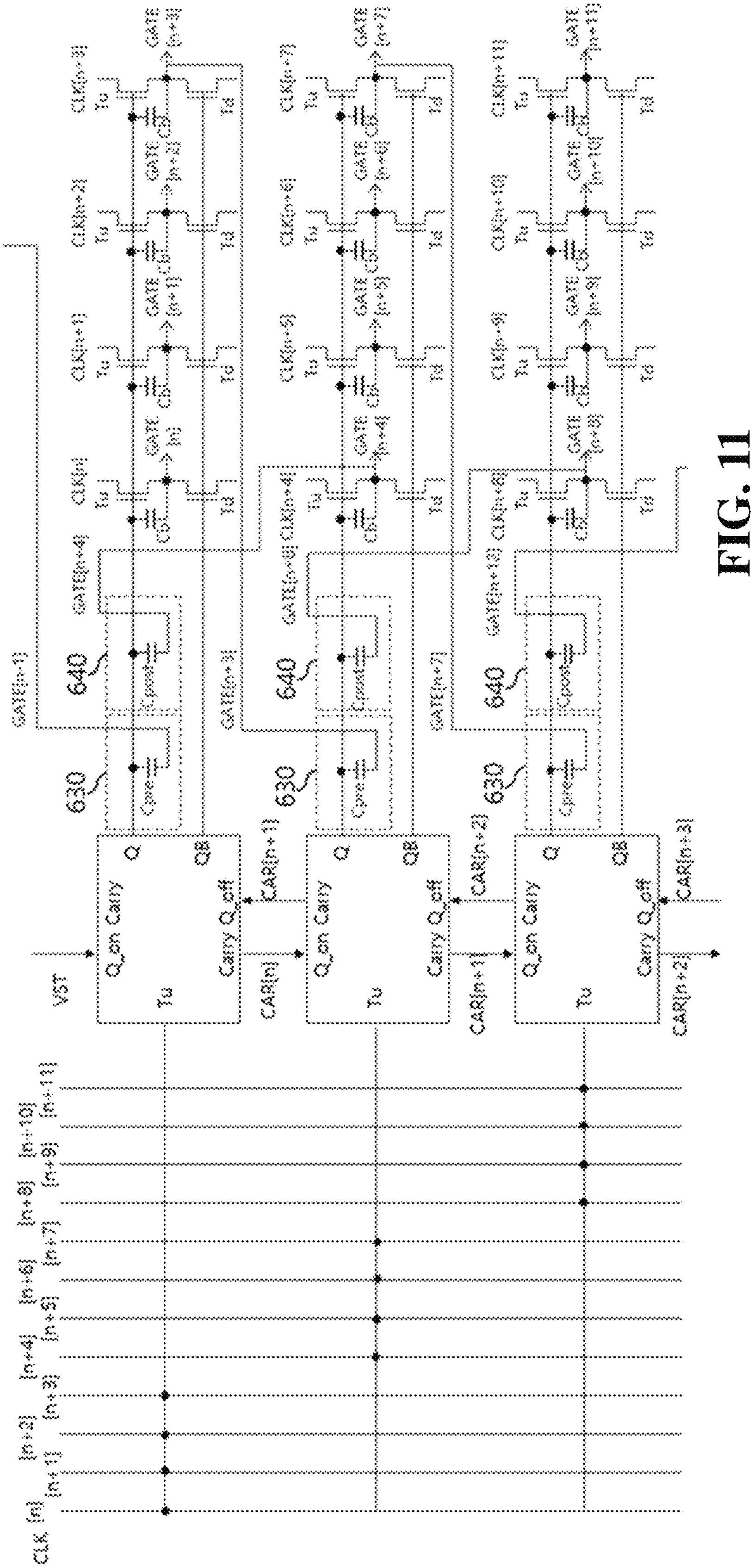

In one embodiment, the first output improvement circuit 630 may include a first capacitor Cpre having one end connected to a first node and the other end connected to a signal line, as shown in FIG. 11. Here, a previous stage gate signal (for example, GATE[n−1]) is input to the signal line.

For example, the previous stage gate signal GATE[n+3] may be input to the first capacitor Cpre of the second stage circuit ST2 through a signal line connected to the last output buffer circuit of the first stage circuit ST1.

In FIGS. 10 and 11, when four clock signals CLK[n] to [n+3], CLK[n+4] to [n+7] or CLK[n+8] to [n+11] are input to the Tu of the node control circuit 610, it may be interpreted that four clock signals are sequentially input to the first output buffer circuit 620 to the Nth output buffer circuit 620.

The second output improvement circuit 640 attenuates the voltage of the Q node by using the next clock signal that is a clock signal whose phase is later than that of a clock signal input to the last output buffer circuit, that is, the Nth output buffer circuit. Here, the second output improvement circuit 640 may attenuate the voltage of the first node by a falling edge of the next clock signal after outputting the gate signal from the Nth output buffer circuit.

The second output improvement circuit 640 using the next clock signal may include a second transistor Tf and a second capacitor C_post, as shown in FIG. 8. In other words, the second output improvement circuit 640 may be implemented as a buffer circuit. Here, the second transistor Tf may include a gate terminal to which a voltage of the first node is input, a first terminal to which a next clock signal (for example, CLK[n+4]) is input, and a second terminal from which a next clock signal is output. And the second capacitor C_post may be connected between the gate terminal and the second terminal of the second transistor Tf to attenuate a voltage of the first node.

In one embodiment, the second output improvement circuit 640 may include a second capacitor (Cpost) having one end connected to the first node and the other end connected to the clock line as shown in FIG. 9. In other words, the second output improvement circuit 640 may be implemented as a capacitor circuit. Here, a next clock signal (for example, CLK[n+4) is input to the clock line.

The above-described second output improvement circuit 640 only attenuates the voltage of the first node and does not output a gate signal like the output buffer circuit.

In other words, the output buffer circuit is connected to the gate line and outputs a gate signal to the gate line, but the second output improvement circuit 640 only attenuates the voltage of the first node and is not connected to the gate line.

In FIGS. 8 and 9, when the next clock signal CLK[n+4], CLK[n+8] or CLK[n] is input to the Tf of the node control circuit 610, it may be interpreted that the next clock signal is input to the second output improvement circuit 640. Here, n is a natural number greater than or equal to 1.

For example, when the clock signal CLK[n+4] inputs to the Tf of the node control circuit 610 in the first stage circuit ST1, it may be interpreted that the clock signal CLK[n+4] is input to the second output improvement circuit 640. Here, in FIGS. 8 and 9, since there are first to Nth output buffer circuits, that is, N output buffer circuits, where N is 4, the clock signal CLK[n+4] may be used as a next clock signal.

When a plurality of output buffer circuits are 2 output buffer circuits, the clock signal CLK[n+2] may be used as a next clock signal.

Meanwhile, the second output improvement circuit 640 may attenuate the voltage of the first node using the next stage gate signal, which is a gate signal output from the first output buffer circuit of the next stage circuit.

For example, the second output improvement circuit 640 of the second stage circuit ST2 may attenuate the voltage of the first node using the next stage gate signal GATE[n+8] output from the first output buffer circuit of the third stage circuit.

Here, the second output improvement circuit 640 may attenuate the voltage of the first node by the falling edge of the next stage gate signal.

The second output improvement circuit 640 using a next stage gate signal may include a second transistor Tf and a second capacitor C_post, as shown in FIG. 10. Here, the second transistor Tf may include a gate terminal to which a voltage of the first node is input, a first terminal to which a next stage gate signal (for example, GATE[n+4]) is input, and a second terminal from which a next stage gate signal is output. In addition, the second capacitor C_post may be connected between the gate terminal and the second terminal of the second transistor Tf to attenuate a voltage of the first node.

In one embodiment, the second output improvement circuit 640 may include a second capacitor (Cpost) having one end connected to the first node and the other end connected to the signal line, as shown in FIG. 11. Here, a next stage gate signal (for example, GATE[n+4]) is input to the signal line.

For example, the next stage gate signal GATE[n+8] may be input to the second capacitor Cpost of the second stage circuit ST2 through a signal line connected to the first output buffer circuit of the third stage circuit ST3.

As described above, before outputting the gate signal from the first output buffer circuit, the first output improvement circuit 630 reinforces the voltage of the first node by the rising edge of the previous clock signal, so that the output deviation in the gate signals output from the first output buffer circuit of the stage circuit may be improved.

And after outputting the gate signal from the last output buffer circuit, i.e., the Nth output buffer circuit, the output deviation in the gate signals output from the Nth output buffer circuit may be improved because the second output improvement circuit 640 attenuates the voltage of the first node by the falling edge of the next clock signal.

Figure 12:
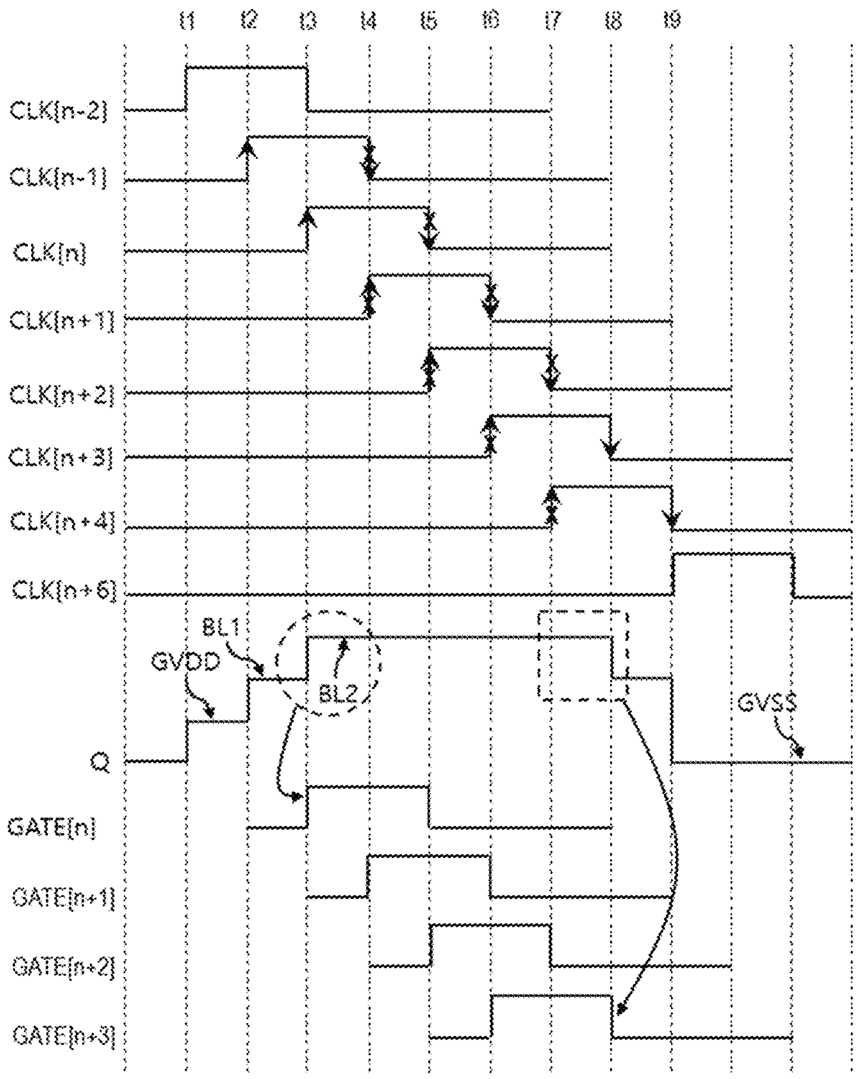
FIG. 12 is a diagram for describing a configuration for improving an output deviation in the stage circuit according to the second embodiment.

Specifically, in the overlapping driving of the stage circuit, the node control circuit 610 pre-charges the voltage of the first node to the first high voltage level GVDD in the interval t1 to t2 of FIG. 12.

And at t2, which is the time point before the first output buffer circuit outputs the gate signal, the first output improvement circuit 630 reinforces the voltage Q of the first node by the rising edge of (n−1)th clock signal CLK[n−1], which is the previous clock signal.

In other words, the first output improvement circuit 630 reinforces the voltage of the first node from the first high voltage level GVDD to the first boosting voltage level BL1 before the first output buffer circuit outputs the gate signal.

Thereafter, the first output buffer circuit reinforces the voltage of the first node again at time point t3. Here, the first output buffer circuit reinforces the voltage of the first node by the rising edge of the nth clock signal CLK[n].

In other words, the first output buffer circuit reinforces the voltage of the first node from the first boosting voltage level BL1 to the second boosting voltage revel BL2 at time point t3.

At time point t4, at which the (n+1)th clock signal CLK[n+1] is input to the second output buffer circuit, the rising edge of the (n+1)th clock signal CLK[n+1] and the falling edge of the (n−1)th clock signal CLK[n−1] overlap to offset the voltage change of the first node.

In other words, during an interval from t3 to t4, the voltage of the first node is maintained at the second boosting voltage level BL2.

At time point t5, at which the (n+2)th clock signal CLK[n+2] is input to the third output buffer circuit, the rising edge of the (n+2)th clock signal CLK[n+2] and the falling edge of the nth clock signal CLK[n] overlap to offset the voltage change of the first node.

At time point t6, at which the (n+3)th clock signal CLK[n+3] is input to the Nth output buffer circuit, which is the last output buffer circuit, the rising edge of the (n+3)th clock signal CLK[n+3] overlaps with the falling edge of the (n+1)th clock signal CLK[n+1] to offset the voltage change of the first node.

In other words, in the interval from t5 to t6, the voltage of the first node is maintained at the second boosting voltage level BL2.

In addition, even at time point t7, at which the (n+4)th clock signal CLK[n+4] that is the next clock signal is input to the second output improvement circuit 640, the rising edge of the (n+4)th clock signal CLK[n+4] and the falling edge of the (n+2)th clock signal CLK[n+2] overlap to offset the voltage change of the first node.

In other words, in the interval from t6 to t7, the voltage of the first node is maintained at the second boosting voltage level BL2.

At time point t8, the voltage of the first node is attenuated from the second boosting voltage level BL2 to the first boosting voltage level BL1 by the falling edge of the (n+3)th clock signal CLK[n+3] inputted to the Nth output buffer circuit.

In other words, in the interval from t7 to t8, the voltage of the first node is maintained at the second boosting voltage level BL2.

In addition, at time point t9, the voltage of the first node may be attenuated from the first boosting voltage level BL1 to the first high voltage level GVDD by the falling edge of the (n+4)th clock signal CLK[n+4] input to the second output improvement circuit 640.

Thereafter, the node control circuit 610 may reset the voltage of the first node to the first low voltage level GVSS.

In general, when a voltage change of the first node occurs, the output deviation occurs in the gate signals.

In the second embodiment, before the first output buffer circuit outputs the gate signal GATE (n), the first output improvement circuit 630 reinforces the voltage of the first node to the first boosting voltage level BL1 as shown in FIG. 12, and the first output buffer circuit reinforces the voltage of the first node to the second boosting voltage level BL2 at time point t3.

And since the voltage of the first node is maintained at the second boosting voltage level BL2 from the time point t3, the voltage change (dotted circle) of the first node does not occur in the interval t3 to t4 where the first output buffer circuit outputs the gate signal GATE[n] at the high voltage level.

Therefore, the length difference between the rising edge of the gate signal GATE[n] output from the first output buffer circuit and the rising edge of the remaining gate signals is significantly reduced.

On the other hand, since the second output improvement circuit 640 attenuates the voltage of the Q node to the first high voltage level GVDD at time point t9 after the Nth output buffer circuit, which is the last output buffer circuit, outputs the gate signal GATE[n+3], the voltage change (sharp dotted line) of the Q node does not occur even in the interval t7 to t8 where the Nth output buffer circuit outputs the gate signal GATE[n+3].

In other words, in the first embodiment, the voltage of the Q node is changed from the second boosting voltage level BL2 to the first boosting voltage level BL1 by the falling edge of the (n+2)th clock signal CLK[n+2] inputted to the third output buffer circuit at time point t7 at which the Nth output buffer circuit outputs the gate signal GATE[n+3].

However, in the second embodiment, since the rising edge of the (n+4)th clock signal CLK[n+4] and the falling edge of the (n+2)th clock signal CLK[n+2] overlap at time point t7 and therefore the voltage change of the first node is offset, the voltage change of the Q-node may not occur until the time point t8 at which the falling edge of the gate signal GATE[n+3] is output. In addition, since the second output improvement circuit 640 attenuates the voltage of the first node after the N-th output buffer circuit outputs the gate signal GATE[n+3], the voltage of the first node may be discharged (reset) stepwise from the time point t8 at which the falling edge of the gate signal GATE[n+3] is output.

Therefore, the length difference between the falling edge of the gate signal GATE[n+3] output from the Nth output buffer circuit and the falling edge of the remaining gate signals is significantly reduced.

Hereinafter, an effect of improving the output of the stage circuit according to one embodiment will be described.

Figure 13:
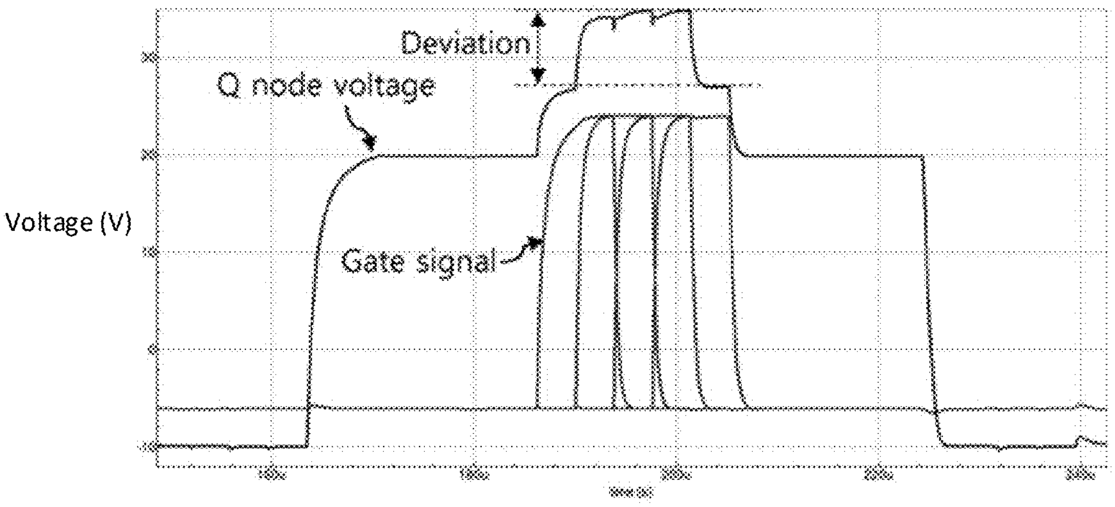
FIG. 13 is a diagram illustrating a Q node voltage change and a gate signal of the stage circuit according to the first embodiment.

FIG. 13 is a diagram illustrating a Q node voltage change and a gate signal of a stage circuit according to a first embodiment.

Figure 14:
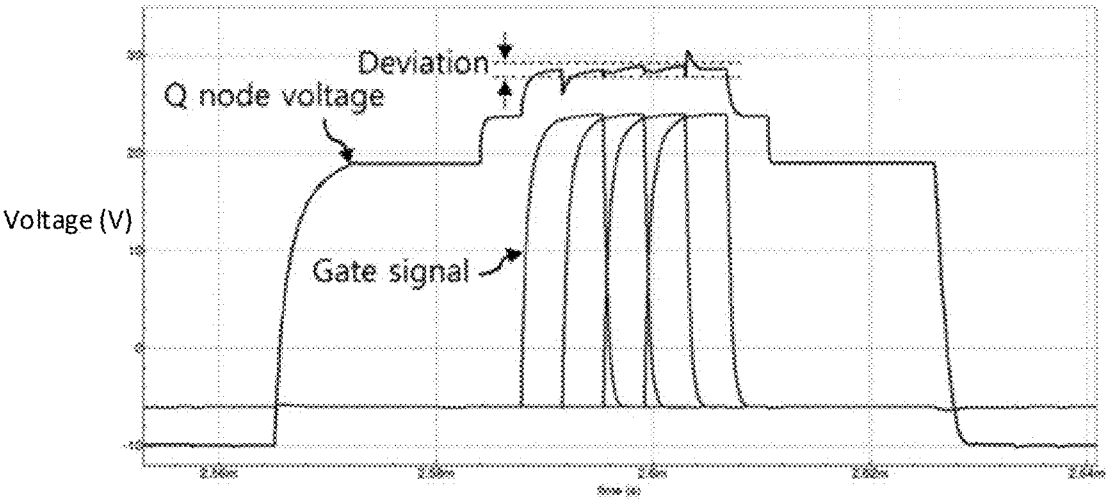
FIGS. 14 and 15 are diagrams illustrating the Q node voltage change and the gate signal of the stage circuit according to the second embodiment.
Figures 15, 16:
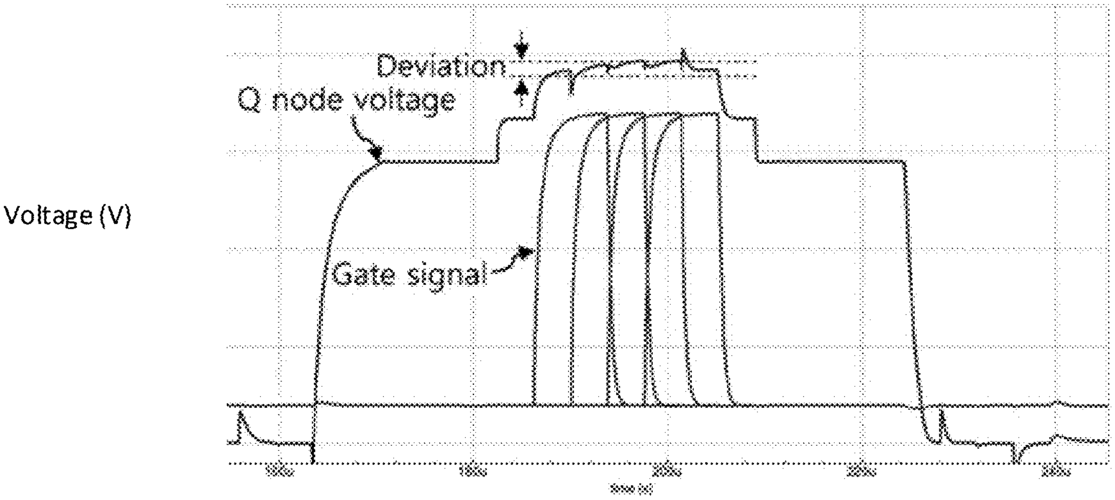
FIG. 16 is a diagram illustrating an output improvement rate of the stage circuit according to the second embodiment.

FIGS. 14 and 15 are diagrams illustrating a voltage change of the Q node which is the first node of a stage circuit, and a gate signal according to a second embodiment. Here, FIG. 14 is a waveform when the first output improvement circuit 630 and the second output improvement circuit 640 are implemented as a buffer circuit. FIG. 15 is a waveform when the first output improvement circuit 630 and the second output improvement circuit 640 are implemented as a capacitor circuit.

In the stage circuit of the first embodiment, since the Q node voltage is reinforced or attenuated when the gate signal is outputted as shown in FIG. 13, the voltage change of the Q node, that is, the voltage deviation, appears large when the gate signal is outputted.

As a result, in the stage circuit of the first embodiment, the rising edge time (time_r) of the gate signal output from the first output buffer circuit becomes 1.21 us longer than the rising edge time (average time) of the remaining gate signals as shown in FIG. 16.

And the falling edge time (time_f) of the gate signal output from the fourth output buffer circuit, which is the last output buffer circuit, becomes 0.15 us longer than the falling edge time (average time) of the remaining gate signals.

However, in the stage circuit of the second embodiment, it can be seen that as shown in FIGS. 14 and 15, the voltage deviation of the Q node appears smaller than that of the stage circuit of the first embodiment since the voltage of the Q node is reinforced in advance before the gate signal is output and the voltage of the Q node is attenuated after the gate signal is output.

For this reason, it can be seen that the waveform of the gate signal appears constant.

Specifically, as shown in FIG. 16, the rising edge time of the gate signal output from the first output buffer circuit becomes 0.09 μs longer or 0.22 μs longer than the rising edge time (average time) of the remaining gate signals.

In other words, it can be seen that the difference between the rising edge time of the gate signal output from the first output buffer circuit and the rising edge time of the remaining gate signals is very small.

And the falling edge time of the gate signal output from the fourth output buffer circuit is 0.05 μs longer or 0.06 μs longer than the falling edge time (average time) of the remaining gate signals.

In other words, it can be seen that the difference between the falling edge time of the gate signal output from the fourth output buffer circuit and the falling edge time of the remaining gate signals is very small.

In conclusion, when the stage circuit of the second embodiment is implemented as a buffer circuit, the output improvement rate of the first output buffer circuit may be 92.86%, and the output improvement rate of the last output buffer circuit may be 62.39%.

And when the stage circuit of the second embodiment is implemented as a capacitor circuit, the output improvement rate of the first output buffer circuit may be 82.14%, and the output improvement rate of the last output buffer circuit may be 60.87%.

As described above, in the stage circuit of the second embodiment, the output of the first output buffer circuit and the output of the last output buffer circuit are significantly improved compared to those of the stage circuit of the first embodiment, so that deterioration of the image quality of the display device does not occur due to output deviation.

Meanwhile, in the stage circuit according to the second embodiment, the number of the first output improvement circuit 630 and the second output improvement circuit 640 may be adjusted according to the length of the high voltage level of the clock signal.

In other words, when the length of the high voltage level of the clock signal corresponds to M horizontal periods (where M is a natural number greater than or equal to 2), the stage circuit may include M−1 first output improvement circuits and M−1 second output improvement circuits.

Figure 17:
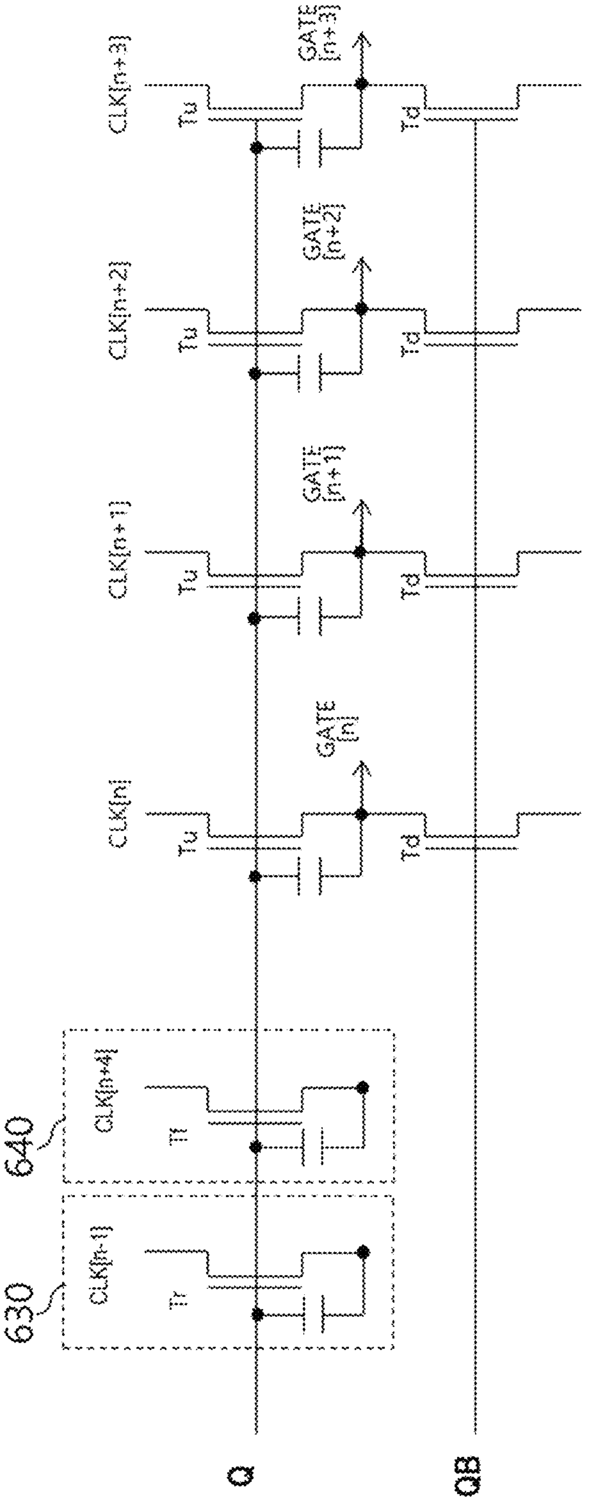
FIGS. 17 and 18 are diagrams for explaining a correlation between the output improvement circuit and 1H overlapping driving in a gate driving circuit according to the second embodiment.
Figure 18:
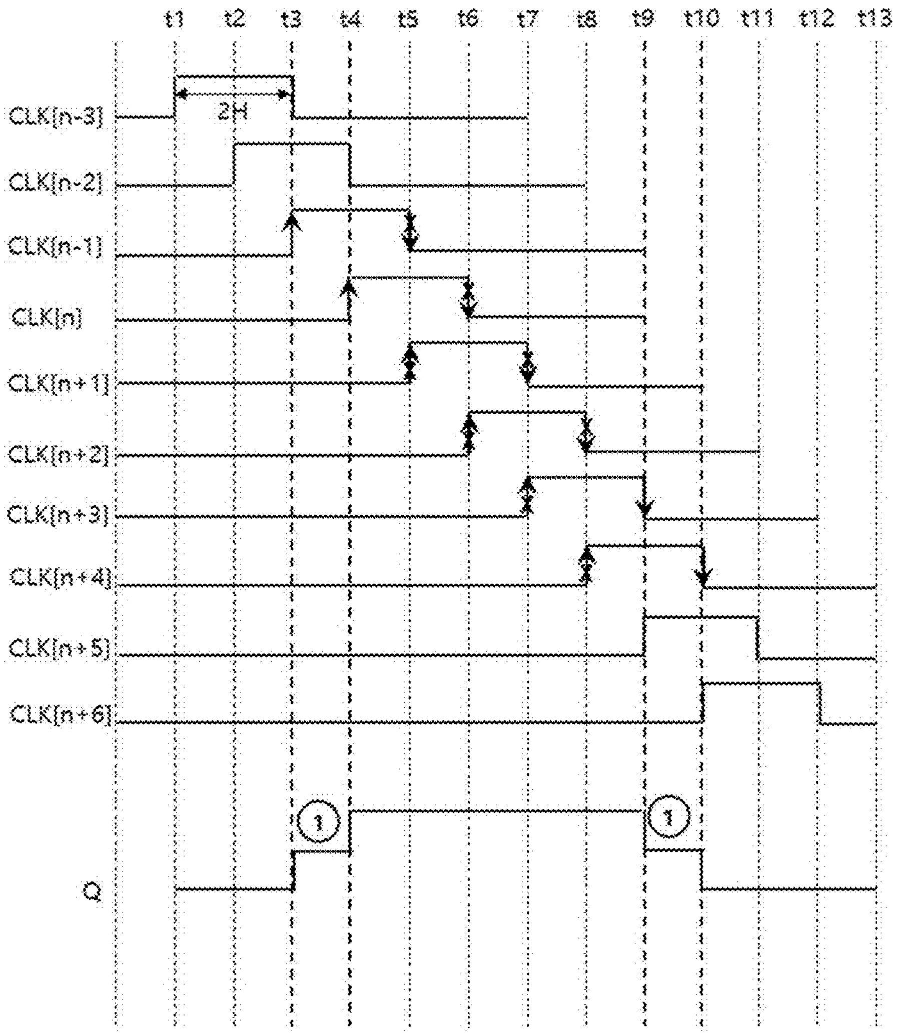

For example, when the stage circuit includes one first output improvement circuit 630 and one second output improvement circuit 640 as shown in FIG. 17, the length of the high voltage level of the clock signal may be two horizontal periods 2H as shown in FIG. 18, and the stage circuit may perform 1H overlapping driving.

And the stage circuit may reinforce once the voltage Q of the Q node, which is the first node, before the gate signal of the first output buffer circuit is output. After the gate signal of the last output buffer circuit is output, the voltage Q of the first node may be attenuated once. In FIG. 18, the waveform of the voltage Q of the first node is a waveform excluding a step of pre-charging the voltage of the first node.

Figure 19:
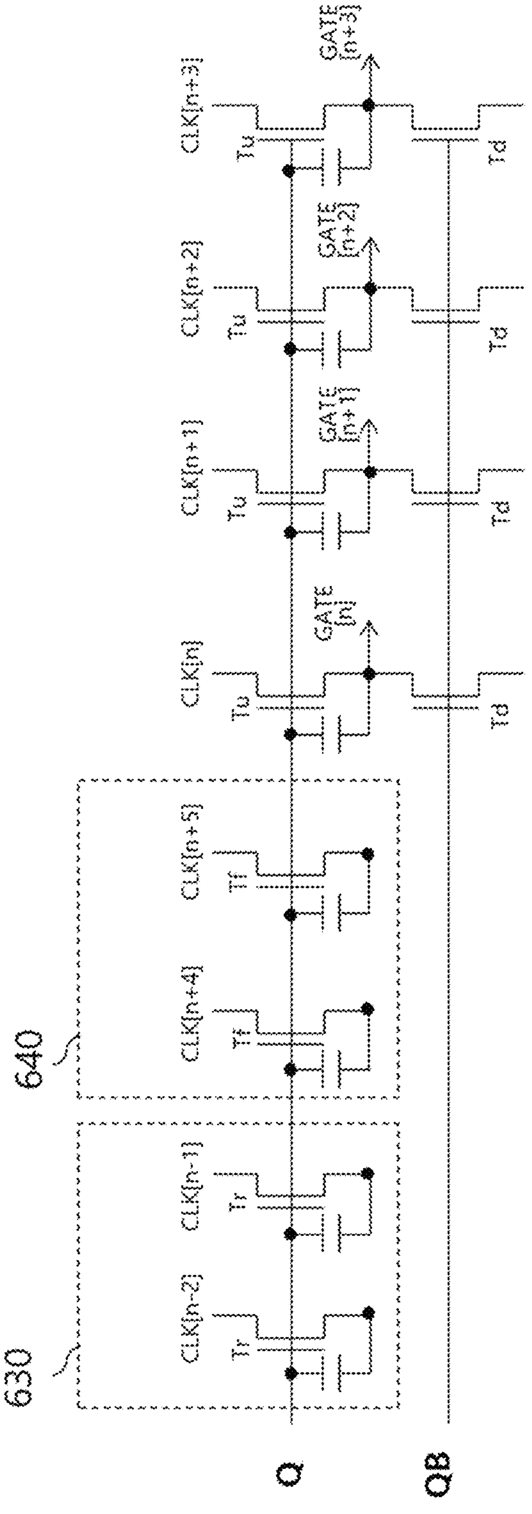
FIGS. 19 and 20 are diagrams for explaining a correlation between the output improvement circuit and 2H overlapping driving in the gate driving circuit according to the second embodiment.
Figure 20:
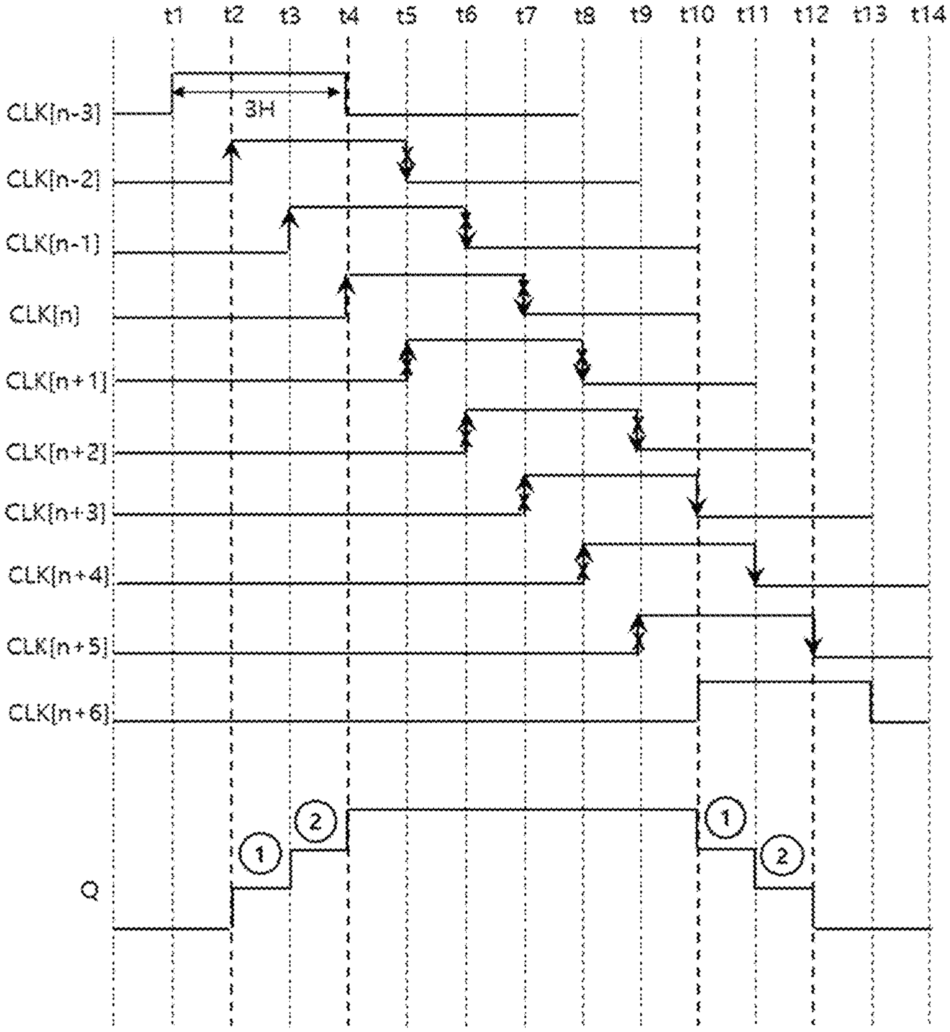

As another example, when the stage circuit includes two first output improvement circuits 630 and two second output improvement circuits 640 as shown in FIG. 19, the length of the high voltage level of the clock signal is three horizontal periods 3H as shown in FIG. 20, and the stage circuit may perform 2H overlapping driving.

And the stage circuit may reinforce twice the voltage Q of the Q node, which is the first node, before outputting the gate signal of the first output buffer circuit. After outputting the gate signal of the last output buffer circuit, the voltage Q of the Q node may be attenuated twice. In FIG. 20, the waveform of the voltage Q of the first node is a waveform excluding a step of pre-charging the first node voltage.

Figure 21:
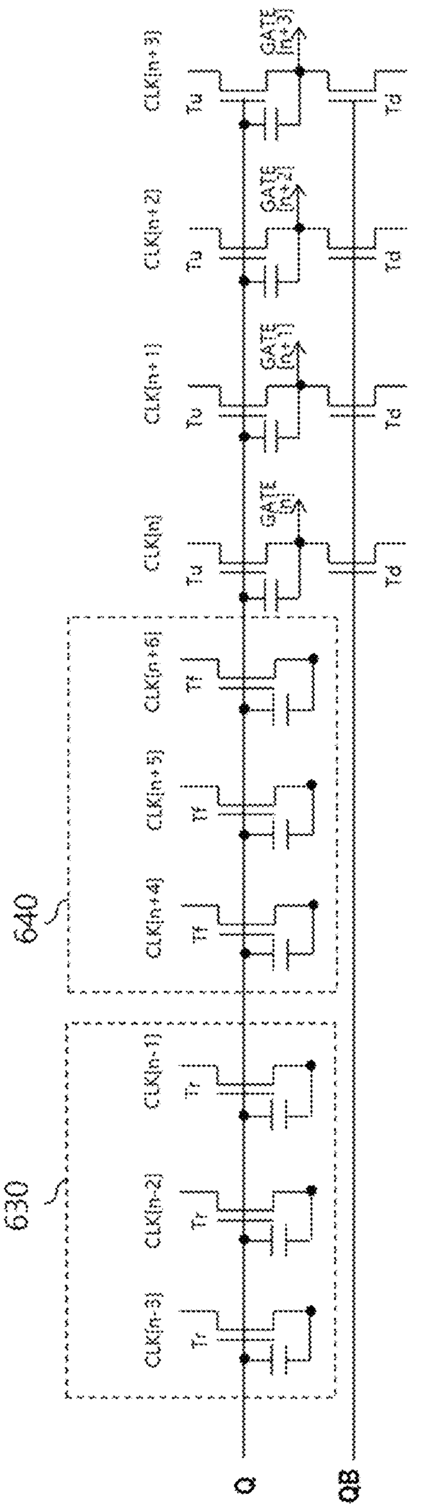
FIGS. 21 and 22 are diagrams for explaining a correlation between the output improvement circuit and 3H overlapping driving in the gate driving circuit according to the second embodiment.
Figure 22:
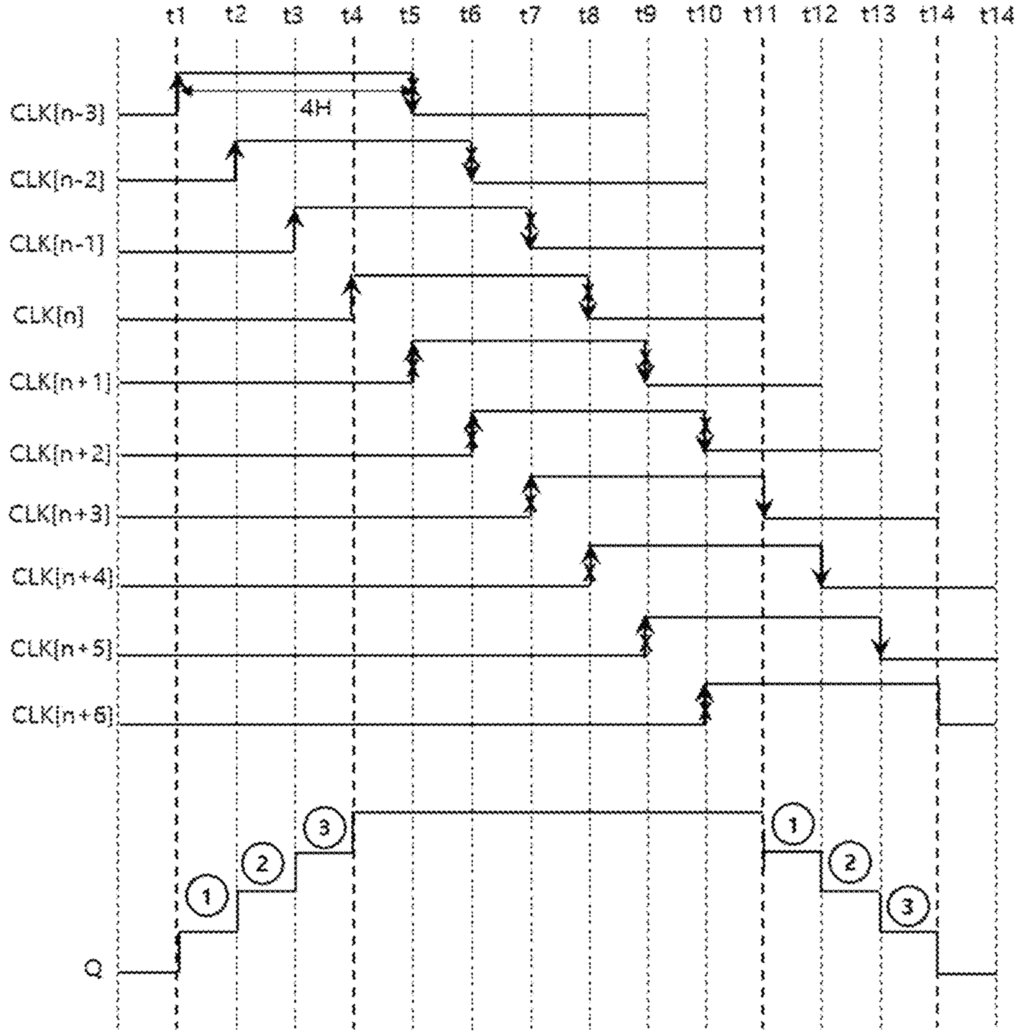

As another example, when the stage circuit includes three first output improvement circuits 630 and three second output improvement circuits 640 as shown in FIG. 21, the length of the high voltage level of the clock signal is four horizontal periods 4H as shown in FIG. 22, and the stage circuit may perform 3H overlapping driving.

And the stage circuit may reinforce three times the voltage Q of the Q node, which is the first node, before outputting the gate signal of the first output buffer circuit. After outputting the gate signal of the last output buffer circuit, the voltage Q of the Q node may be attenuated three times. In FIG. 22, the waveform of the voltage Q of the first node is a waveform excluding the step of pre-charging the first node voltage.

As described above, in the second embodiment, the stage circuit may reinforce or attenuate the voltage of the Q node, which is the first node, by the number of horizontal periods of overlapping driving.

Accordingly, output deviations of the first output buffer circuit and the last output buffer circuit may be improved.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

| Description of Reference numerals | |
|---|---|
| 100: | Display panel |
| 110: | Data drive circuit |
| 120: | Gate drive circuit |
| 130: | Timing controller |
| 200: | Host System |
| 300: | Power Supply |

-continued

| Description of Reference numerals | |
|---|---|
| 610: | Node control circuit |
| 620: | First to Nth output buffer circuits |
| 630: | 1st output improvement Circuit |
| 640: | 2nd output improvement circuit |

What is claimed is:

1. A gate driving circuit comprising:

at least one stage circuit configured to supply gate signals to a plurality of gate lines and including a first node, wherein the at least one stage circuit includes:

N output buffer circuits configured to sequentially output pulses of the gate signals in response to pulses of corresponding clock signals while the first node is in a pre-charged state; and an output improvement circuit configured to improve an output deviation of a first output buffer circuit among the N output buffer circuits that outputs a first gate signal among the sequentially output pulses of the gate signals and improve an output deviation of an Nth output buffer circuit among the N output buffer circuits that outputs a last gate signal among the sequentially output pulses of the gate signals, among the N output buffer circuits, wherein the output improvement circuit includes a first output improvement circuit configured to reinforce a voltage of the first node in response to a previous clock signal whose phase is one phase earlier than that of a clock signal input to the first output buffer circuit, and wherein N is a natural number greater than or equal to 2.

2. The gate driving circuit of claim 1, wherein the output improvement circuit includes:

a second output improvement circuit configured to attenuate the voltage of the first node in response to a next clock signal whose phase is one phase later than that of the clock signal input to the Nth output buffer circuit.

3. The gate driving circuit of claim 2, wherein the first output improvement circuit reinforces the voltage of the first node by a rising edge of the previous clock signal before the first output buffer circuit outputs the first gate signal, and the second output improvement circuit attenuates the voltage of the first node by a falling edge of the next clock signal after the Nth output buffer circuit outputs the first gate signal.

4. The gate driving circuit of claim 2, wherein the first output improvement circuit includes a first transistor comprising a gate terminal to which the voltage of the first node is input, a first terminal to which the previous clock signal is input, and a second terminal from which the previous clock signal is output, and a first capacitor connected to the gate terminal and the second terminal to reinforce the voltage of the first node.

5. The gate driving circuit of claim 2, wherein the second output improvement circuit includes a second transistor including a gate terminal to which the voltage of the first node is applied, a first terminal to which the next clock signal is input, and a second terminal from which the next clock signal is output, and a second capacitor connected to the gate terminal and the second terminal to attenuate the voltage of the first node.

6. The gate driving circuit of claim 2, wherein the first output improvement circuit includes a first capacitor having one end connected to the first node and another end connected to a clock line to which the previous clock signal is input.

7. The gate driving circuit of claim 2, wherein the second output improvement circuit includes a second capacitor having one end connected to the first node and another end connected to a clock line to which the next clock signal is input.

8. The gate driving circuit of claim 2, wherein when a length of a high voltage level of the clock signal corresponds to M horizontal periods, the stage circuit includes M−1 first output improvement circuits and M−1 second output improvement circuits, and wherein M is a natural number greater than or equal to 2.

9. A gate driving circuit comprising:

a first stage circuit, a second stage circuit, and a third stage circuit configured to supply gate signals to a plurality of gate lines and including a first node, wherein each of the first stage circuit, the second stage circuit, and the third stage circuit includes:

first to Nth output buffer circuits configured to sequentially output pulses of gate signals in response to pulses of corresponding clock signals while the first node is in a pre-charged state; and an output improvement circuit configured to improve an output deviation of the first output buffer circuit that outputs a first gate signal among the sequentially output pulses of the gate signals and an output deviation of the Nth output buffer circuit that outputs a last gate signal among the sequentially output pulses of the gate signals, wherein the output improvement circuit of the second stage circuit includes a first output improvement circuit configured to reinforce a voltage of the first node in response to a first stage gate signal, which is a gate signal output from the Nth output buffer circuit of the first stage circuit, and wherein N is a natural number greater than or equal to 2.

10. The gate driving circuit of claim 9, wherein the output improvement circuit of the second stage circuit includes:

a second output improvement circuit configured to attenuate the voltage of the first node in response to a second stage gate signal, which is a gate signal output from a first output buffer circuit of the third stage circuit.

11. The gate driving circuit of claim 10, wherein the first output improvement circuit reinforces the voltage of the first node by a rising edge of the first stage gate signal before the first output buffer circuit outputs a gate signal, and the second output improvement circuit attenuates the voltage of the first node by a falling edge of the second stage gate signal after the Nth output buffer circuit outputs a gate signal.

12. The gate driving circuit of claim 10, wherein the first output improvement circuit includes a first transistor including a gate terminal to which the voltage of the first node is applied, a first terminal to which the first stage gate signal is input, and a second terminal from which the first stage gate signal is output, and a first capacitor connected to the gate terminal and the second terminal to reinforce the voltage of the first node.

13. The gate driving circuit of claim 10, wherein the second output improvement circuit includes a second transistor including a gate terminal to which the voltage of the first node is applied, a first terminal to which the second stage gate signal is input, and a second terminal from which the second stage gate signal is output, and a second capacitor connected to the gate terminal and the second terminal to attenuate the voltage of the first node.

14. The gate driving circuit of claim 10, wherein the first output improvement circuit includes a first capacitor having one end connected to the first node and another end connected to a signal line to which the first stage gate signal is input.

15. The gate driving circuit of claim 10, wherein the second output improvement circuit includes a second capacitor having one end connected to the first node and another end connected to a signal line to which the second stage gate signal is input.

16. A display device comprising:

a display panel that includes a plurality of pixel circuits, wherein the plurality of pixel circuits are connected to corresponding data lines and gate lines;

a data driving circuit configured to output a data signal applied to a data line from the data lines;

a gate driving circuit configured to receive a clock signal and supply a gate signal to a gate line from the gate lines; and a timing controller configured to control driving of the data driving circuit and the gate driving circuit and, wherein the gate driving circuit is configured to:

supply gate signals to the gate lines, and includes a first stage circuit, a second stage circuit, and a third stage circuit including a first node, each of the first stage circuit, the second stage circuit, and the third stage circuit includes:

first to Nth output buffer circuits configured to sequentially output pulses of the gate signal using pulses of the corresponding clock signal while the first node is in a pre-charged state; and an output improvement circuit configured to improve an output deviation of the first output buffer circuit that outputs a first gate signal among the sequentially output pulses of the gate signals and an output deviation of the Nth output buffer circuit that outputs a first stage gate signal among the sequentially output pulses of the gate signals, wherein the output improvement circuit of the second stage circuit includes a first output improvement circuit configured to reinforce a voltage of the first node in response to the first stage gate signal, which is a gate signal output from the Nth output buffer circuit of the first stage circuit, and wherein N is a natural number greater than or equal to 2.

17. The display device of claim 16, wherein the output improvement circuit of the second stage circuit includes:

a second output improvement circuit configured to attenuate the voltage of the first node after the gate signal is output from the Nth output buffer circuit.

18. The display device of claim 17, wherein the first output improvement circuit reinforces the voltage of the first node in response to a pulse of a previous clock signal whose phase is earlier than that of a clock signal input to the first output buffer circuit, and the second output improvement circuit attenuates the voltage of the first node in response to a pulse of a next clock signal whose phase is later than a clock signal input to the Nth output buffer circuit.

19. The display device of claim 18, wherein the first output improvement circuit reinforces the voltage of the first node by a rising edge of the previous clock signal, and the second output improvement circuit attenuates the voltage of the first node by a falling edge of the next clock signal.

20. The display device of claim 17, wherein the first output improvement circuit reinforces the voltage of the first node in response to a pulse of the first stage gate signal, which is a gate signal output from a last output buffer circuit of the first stage circuit, and the second output improvement circuit attenuates the voltage of the first node in response to a pulse of a second stage gate signal, which is a gate signal output from a first output buffer circuit of the third stage circuit.

21. The display device of claim 20, wherein the first output improvement circuit reinforces the voltage of the first node by a rising edge of the first stage gate signal, and the second output improvement circuit attenuates the voltage of the first node by a falling edge of the second stage gate signal.

* * * * *